United States Patent
Xu et al.

(10) Patent No.: US 11,219,091 B2
(45) Date of Patent: Jan. 4, 2022

(54) DATA RECEIVING STATUS REPORTING METHOD AND APPARATUS

(71) Applicant: HUAWEI TECHNOLOGIES CO., LTD., Guangdong (CN)

(72) Inventors: Haibo Xu, Beijing (CN); Nathan Edward Tenny, San Diego, CA (US); Jian Wang, Beijing (CN); Yiru Kuang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 35 days.

(21) Appl. No.: 16/610,654

(22) PCT Filed: May 5, 2017

(86) PCT No.: PCT/CN2017/083351
§ 371 (c)(1),
(2) Date: Nov. 4, 2019

(87) PCT Pub. No.: WO2018/201498
PCT Pub. Date: Nov. 8, 2018

(65) Prior Publication Data
US 2020/0281043 A1    Sep. 3, 2020

(51) Int. Cl.
*H04W 80/08*    (2009.01)
*H04L 1/16*    (2006.01)
(Continued)

(52) U.S. Cl.
CPC .......... *H04W 80/08* (2013.01); *H04L 1/1614* (2013.01); *H04L 1/1642* (2013.01);
(Continued)

(58) Field of Classification Search
CPC . H04W 80/08; H04W 28/0278; H04W 80/02; H04W 88/04; H04W 80/00;
(Continued)

(56) References Cited

U.S. PATENT DOCUMENTS

2010/0215020 A1*    8/2010    Lee .................. H04L 1/1841
                                                    370/331
2011/0090793 A1    4/2011    Halfmann et al.
(Continued)

FOREIGN PATENT DOCUMENTS

CN    101828364 A    9/2010
CN    101997660 A    3/2011
(Continued)

OTHER PUBLICATIONS

International Search Report for PCT/CN2017/083351 dated Jan. 29, 2018, 4 pages.
(Continued)

*Primary Examiner* — Afshawn M Towfighi

(57) ABSTRACT

Embodiments provide a data receiving status reporting method and apparatus. The method includes: determining, by first user equipment, a status of receiving at least one packet data convergence protocol layer protocol data unit PDCP PDU by second user equipment, where the at least one PDCP PDU is forwarded by the first user equipment to the second user equipment after being received by the first user equipment through a communications link between the first user equipment and a network device; and sending, by the first user equipment, a first status report to the network device, where the first status report is used to indicate the status of receiving the at least one PDCP PDU by the second user equipment.

21 Claims, 11 Drawing Sheets

(51) Int. Cl.
*H04W 28/02* (2009.01)
*H04W 80/02* (2009.01)
*H04W 88/04* (2009.01)

(52) U.S. Cl.
CPC ....... *H04L 1/1671* (2013.01); *H04W 28/0278* (2013.01); *H04W 80/02* (2013.01); *H04W 88/04* (2013.01)

(58) Field of Classification Search
CPC ... H04L 1/1614; H04L 1/1642; H04L 1/1671; H04L 2001/0097; H04L 1/1628; H04L 1/18
See application file for complete search history.

(56) References Cited

U.S. PATENT DOCUMENTS

| | | | | |
|---|---|---|---|---|
| 2012/0140704 A1* | 6/2012 | Zhao | ..................... | H04L 1/1835 370/315 |
| 2012/0224525 A1* | 9/2012 | Wang | ..................... | H04W 80/02 370/315 |
| 2015/0009961 A1 | 1/2015 | Natarajan et al. | | |
| 2016/0044737 A1 | 2/2016 | Kwon | | |
| 2016/0164793 A1* | 6/2016 | Basu Mallick | ....... | H04L 47/564 370/235 |
| 2020/0281043 A1* | 9/2020 | Xu | ........................... | H04L 1/18 |

FOREIGN PATENT DOCUMENTS

| | | |
|---|---|---|
| CN | 102246555 A | 11/2011 |
| CN | 102474848 A | 5/2012 |
| CN | 102598774 A | 7/2012 |
| CN | 104519534 A | 4/2015 |
| EP | 2073424 A1 | 6/2009 |
| EP | 2469750 A1 | 6/2012 |
| WO | 2008030050 A1 | 3/2008 |
| WO | 2011020233 A1 | 2/2011 |
| WO | 2011053490 A1 | 5/2011 |

OTHER PUBLICATIONS

R2-1703365 Nokia et al.,"Data lossless path switch", 3GPP TSG-RAN WG2 Meeting #97bis,Spokane, USA, Apr. 3-7, 2017 (3 pages).

* cited by examiner

| D/C | PDU type | UE local ID | Oct 1 |
|---|---|---|---|
| UE local ID || DRB ID | Oct 2 |
| R | HDS || Oct 3 |
| Buffer size ||| Oct 4 |
| Buffer size ||| Oct 5 |
| Buffer size ||| Oct 6 |
| Buffer size ||| Oct 7 |

FIG. 6b

| D/C | PDU type | UE local ID | Oct 1 |
|---|---|---|---|
| UE local ID || DRB ID | Oct 2 |
| R | ACK_SN || Oct 3 |
| R | NACK_SN || Oct 4 |
| R | NACK_SN || Oct 5 |
| ... ||| |

FIG. 7a

| D/C | PDU type | UE local ID | | Oct 1 |
|---|---|---|---|---|
| UE local ID | | DRB ID | | Oct 2 |
| Buffer size | | | | Oct 4 |
| Buffer size | | | | Oct 5 |
| Buffer size | | | | Oct 6 |
| Buffer size | | | | Oct 7 |
| R | ACK_SN | | | Oct 8 |
| R | NACK_SN | | | Oct 9 |
| R | NACK_SN | | | Oct 10 |
| ... | | | | Oct 11 |

FIG. 7b

| D/C | PDU type | UE local ID | Oct 1 |
|---|---|---|---|
| UE local ID | | DRB ID | Oct 2 |
| R | FUDS | | Oct 3 |
| ... | | | |

FIG. 8a

| D/C | PDU type | UE local ID | Oct 1 |
|---|---|---|---|
| UE local ID | | DRB ID | Oct 2 |
| R | FUDS | | Oct 3 |
| Buffer size | | | Oct 4 |
| Buffer size | | | Oct 5 |
| Buffer size | | | Oct 6 |
| Buffer size | | | Oct 7 |
| Bitmap | | | Oct 8 |
| Bitmap | | | Oct 9 |
| ... | | | Oct 10 |

FIG. 8b

DATA RECEIVING STATUS REPORTING METHOD AND APPARATUS

CROSS-REFERENCE TO RELATED APPLICATIONS

This application is a National Stage of International Application No. PCT/CN2017/083351, filed on May 5, 2017, which is hereby incorporated by reference in its entirety.

TECHNICAL FIELD

This application relates to the communications field, and in particular, to a data receiving status reporting method and an apparatus.

BACKGROUND

Currently, a first user equipment ("UE") may establish a non-direct communication path with a base station by using another user equipment, to perform data communication with the base station. This mode may be referred to as a non-direct communication mode. In this case, the first user equipment may be referred to as "remote" UE, and the another user equipment may be referred to as "relay" UE.

In LTE Rel-15, data forwarding above a radio link control ("RLC") layer and below a packet data convergence protocol (PDCP) layer of the relay UE is being researched. Such data forwarding may be referred to as Layer 2 UE-to-NW Relay. In this case, the relay UE may be referred to as a Layer 2 relay UE.

When the remote UE communicates with the base station through a non-direct communication path of a Layer 2 UE-to-NW relay, the relay UE receives downlink data sent by the base station, and forwards the downlink data to the remote UE. However, the base station does not know the remote UE's status of receiving the downlink data, and therefore continues to send subsequent downlink data to the relay UE by using the non-direct communication path of the Layer 2 UE-to-NW Relay. In reality, the remote UE may fail to receive some of the downlink data. Consequently, downlink data of the remote UE is lost.

Alternatively, after a communication path between the remote UE and the base station is switched from the non-direct path to a direct path, the base station does not know the remote UE's status of receiving the downlink data sent by the base station to the remote UE by using the non-direct path, and the base station continues to send subsequent downlink data to the relay UE by using the direct communication path. In reality, the remote UE may fail to receive some of the downlink data. Consequently, downlink data of the remote UE is lost.

SUMMARY

Embodiments provide a data receiving status reporting method and apparatus. When a communication path between a UE and a base station is to be switched from a non-direct path to a direct path, it can be ensured that the UE sequentially receives downlink data sent by the base station.

The following technical solutions are used in the embodiments to achieve the foregoing objective.

According to a first aspect, a data receiving status reporting method is disclosed.

There is a direct path between a network device and first user equipment, and there is a non-direct path between the network device and second user equipment. The second user equipment communicates with the network device through relay by the first user equipment. The first user equipment determines the second user equipment's status of receiving at least one packet data convergence protocol (PDCP) layer protocol data unit (PDU) (i.e., at least one PDCP PDU) by the second user equipment, where the at least one PDCP PDU is forwarded by the first user equipment to the second user equipment after being received by the first user equipment through a communications link between the first user equipment and the network device; and the first user equipment sends a first status report to the network device, where the first status report is used to indicate the status of the second user equipment receiving the at least one PDCP PDU.

When there is a non-direct path between the second user equipment and a base station, the base station sends at least one data packet (the foregoing at least one PDCP PDU) to the second user equipment by using the first user equipment. The first user equipment determines the second user equipment's status of receiving the at least one data packet by the second user equipment, and reports, to the base station, the status of the second user equipment receiving the at least one data packet. When there is a direct path between the second user equipment and the base station, the base station may retransmit, in at least one data packet to the second user equipment based on a real status of receiving the at least one data packet by the second user equipment, a data packet that is not successfully received by the second user equipment. In example prior art, a status report fed back by the first user equipment to the base station can only reflect a status of receiving the at least one data packet by the first user equipment. If a packet loss occurs on a transmission path between the first user equipment and the second user equipment, the status report cannot reflect the real status of receiving the at least one data packet by the second user equipment. However, in this example embodiment, the status report that is fed back by the first user equipment and that is received by the base station can truly reflect the status of receiving the at least one data packet by the second user equipment, and therefore out-of-order receiving by the second user equipment is avoided when the base station transmits a data packet to the second user equipment based on the status report.

With reference to the example data receiving status reporting method, in a first possible implementation, the first status report includes first information; and the first information is used to indicate a sequence number ("SN") of a PDCP PDU that is in PDCP PDUs successfully forwarded by the first user equipment consecutively and that has a highest PDCP sequence number SN or a highest PDCP count value in the at least one PDCP PDU; or the first information is used to indicate a sequence number SN of the last PDCP PDU that is in PDCP PDUs successfully forwarded by the first user equipment consecutively in the at least one PDCP PDU; or the first information is used to indicate a sequence number SN of a PDCP PDU following a PDCP PDU that is in PDCP PDUs successfully forwarded by the first user equipment consecutively and that has a highest PDCP SN or a highest PDCP count value in the at least one PDCP PDU; or the first information is used to indicate a sequence number SN of a PDCP PDU following the last PDCP PDU that is in PDCP PDUs successfully forwarded by the first user equipment consecutively in the at least one PDCP PDU; or the first information is used to indicate a sequence number SN of a PDCP PDU that is in PDCP PDUs successfully received by the second user equipment consecutively and that has a highest PDCP SN or a highest PDCP count value in the at least one PDCP PDU; or the first information indicates a sequence number SN of the last PDCP PDU that is in PDCP PDUs successfully received by the second user equipment consecutively in the at least one PDCP PDU; or the first information is used to indicate a sequence number SN of a PDCP PDU following a PDCP PDU that is in PDCP PDUs successfully received by the second user equipment consecutively and that has a highest PDCP SN or a highest PDCP count value in the at least one PDCP PDU; or the first information is used to indicate a sequence number SN of a PDCP PDU following the last PDCP PDU that is in PDCP PDUs successfully received by the second user equipment consecutively.

In this way, the first user equipment indicates, to the network device, the last PDCP PDU (or the PDCP PDU following the last PDCP PDU) that is in the PDCP PDUs successfully received by the second user equipment consecutively in the at least one PDCP PDU. After receiving the first status report, the network device starts to transmit, to the second user equipment, the PDCP PDU following the last PDCP PDU that is in the PDCP PDUs successfully received by the second user equipment consecutively in the at least one PDCP PDU. In this way, the second user equipment may receive a lost PDCP PDU in the at least one PDCP PDU before receiving a PDCP PDU following the at least one PDCP PDU sent by the network device, and therefore out-of-order receiving is avoided.

With reference to either the example data receiving status reporting method or the foregoing example implementation of the example data receiving status reporting method, in a second possible example implementation of the example data receiving status reporting method, the first status report includes second information; and the second information is used to indicate a sequence number SN of a PDCP PDU that is successfully forwarded by the first user equipment and that has a highest PDCP SN or a highest PDCP count value in the at least one PDCP PDU; or the second information is used to indicate a sequence number SN of a PDCP PDU following a PDCP PDU that is successfully forwarded by the first user equipment and that has a highest PDCP SN or a highest PDCP count value in the at least one PDCP PDU; or the second information is used to indicate a sequence number SN of a PDCP PDU that is successfully received by the second user equipment and that has a highest PDCP SN or a highest PDCP count value in the at least one PDCP PDU; or the second information is a sequence number SN of a PDCP PDU following a PDCP PDU that is successfully received by the second user equipment and that has a highest PDCP SN or a highest PDCP count value in the at least one PDCP PDU.

In this way, the first user equipment indicates, to the network device, the last PDCP PDU (or a PDCP PDU following the last PDCP PDU) successfully received by the second user equipment in the at least one PDCP PDU. After receiving the first status report, the network device may determine which PDCP PDU is the last one successfully received by the second user equipment in the at least one PDCP PDU.

With reference to any one of the example data receiving status reporting method or the foregoing implementations of the example data receiving status reporting method, in a third possible example implementation of the example data receiving status reporting method, the first status report further includes third information, and the third information is a PDCP sequence number of a lost PDCP PDU in the at least one PDCP PDU forwarded by the first user equipment to the second user equipment.

In this way, after receiving the first status report, in addition to determining which PDCP PDU is last successfully received by the second user equipment in the at least one PDCP PDU, the network device may determine which PDCP PDU before or after the PDCP PDU has not been received by the second user equipment. After receiving the first status report, the network device retransmits, to the second user equipment, a PDCP PDU that has not yet been received by the second user equipment in the at least one PDCP PDU. In this way, the second user equipment may receive a lost PDCP PDU in the at least one PDCP PDU before receiving a PDCP PDU following the at least one PDCP PDU sent by the network device, and therefore out-of-order receiving is avoided.

With reference to any one of the example data receiving status reporting method or the foregoing implementations of the example data receiving status reporting method, in a fourth possible implementation of the example data receiving status reporting method, the first status report includes fourth information, and the fourth information is a sequence number SN of the first lost PDCP PDU in the at least one PDCP PDU forwarded by the first user equipment to the second user equipment; or the fourth information is a sequence number SN of the first PDCP PDU that is not received by the second user equipment in the at least one PDCP PDU forwarded by the first user equipment to the second user equipment.

In this way, after the first user equipment sends the first status report to the network device, the network device may determine which PDCP PDU in the at least one PDCP PDU is the first PDCP PDU that is not received by the second user equipment.

With reference to any one of the example data receiving status reporting method or the foregoing implementations of the example data receiving status reporting method, in a fifth possible implementation of the example data receiving status reporting method, the first status report further includes fifth information, and the fifth information is used to indicate a receiving status of a PDCP PDU after the first lost PDCP PDU or a receiving status of a PDCP PDU after the first PDCP PDU that is not received by the second user equipment.

In this way, the network device determines which PDCP PDU in the at least one PDCP PDU is the first PDCP PDU that is not received by the second user equipment, and may further determine, based on the first status report, which PDCP PDU after the PDCP PDU is received by the second user equipment, and which PDCP PDU after the PDCP PDU is not received by the second user equipment. After a communication path between the network device and the second user equipment is switched to a direct path, the network device first retransmits, to the second user equipment, a PDCP PDU that has not yet been received by the second user equipment in the at least one PDCP PDU. In this way, the second user equipment may receive a lost PDCP PDU in the at least one PDCP PDU before receiving a PDCP PDU following the at least one PDCP PDU sent by the network device, and therefore out-of-order receiving is avoided.

With reference to any one of the example data receiving status reporting method or the foregoing implementations of the example data receiving status reporting method, in a sixth possible implementation of the example data receiving status reporting method, the first status report further includes at least one of sixth information and seventh information; the sixth information is a user equipment identifier of the second user equipment; and the seventh information is a radio bearer identifier of the second user equipment.

With reference to any one of the example data receiving status reporting method or the foregoing implementations of the example data receiving status reporting method, in a seventh possible implementation of the example data receiving status reporting method, the first status report is generated by one or more of an RLC layer, a PDCP, and an adaptation layer between the PDCP and the RLC of the first user equipment.

With reference to any one of the example data receiving status reporting method or the foregoing implementations of the example data receiving status reporting method, in an eighth possible implementation of the example data receiving status reporting method, before the first user equipment sends the first status report to the network device, the method further includes: receiving, by the first user equipment, a second status report sent by the second user equipment, where the second status report is a radio link control (RLC) layer status report, and the second status report is used to indicate a status of receiving an RLC PDU by the second user equipment.

In other words, a trigger condition of the first status report may be "receiving a second status report sent by the second user equipment". The first user equipment triggers and generates the first status report once the first user equipment receives the second status report sent by the second user equipment.

With reference to any one of the example data receiving status reporting method or the foregoing implementations of the example data receiving status reporting method, in a ninth possible implementation of the example data receiving status reporting method, that the first user equipment determines a status of receiving at least one PDCP PDU by the second user equipment specifically includes: the first user equipment determines, based on the second status report, the status of receiving the at least one PDCP PDU by the second user equipment.

According to a second aspect, an example apparatus is disclosed and is disposed in user equipment, the user equipment is first user equipment, and the apparatus includes:

a determiner, configured to determine a status of receiving at least one packet data convergence protocol layer protocol data unit PDCP PDU by second user equipment, where the at least one PDCP PDU is forwarded by the first user equipment to the second user equipment by using a transmitter after being received by the first user equipment through a communications link between the first user equipment and a network device, where the transmitter is further configured to send a first status report to the network device, where the first status report is used to indicate the status of receiving the at least one PDCP PDU by the second user equipment.

With reference to the example first user equipment apparatus, in a first possible implementation of the example first user equipment apparatus, the first status report includes first information; and the first information is used to indicate a sequence number SN of a PDCP PDU that is in PDCP PDUs successfully forwarded by the transmitter consecutively and that has a highest PDCP sequence number SN or a highest PDCP count count value in the at least one PDCP PDU; or the first information is used to indicate a sequence number SN of the last PDCP PDU that is in PDCP PDUs successfully forwarded by the transmitter consecutively in the at least one PDCP PDU; or the first information is used to indicate a sequence number SN of a PDCP PDU following a PDCP PDU that is in PDCP PDUs successfully forwarded by the transmitter consecutively and that has a highest PDCP SN or a highest PDCP count value in the at least one PDCP PDU; or the first information is used to indicate a sequence number SN of a PDCP PDU following the last PDCP PDU that is in PDCP PDUs successfully forwarded by the transmitter consecutively in the at least one PDCP PDU; or the first information is used to indicate a sequence number SN of a PDCP PDU that is in PDCP PDUs successfully received by the second user equipment consecutively and that has a highest PDCP SN or a highest PDCP count value in the at least one PDCP PDU; or the first information indicates a sequence number SN of the last PDCP PDU that is in PDCP PDUs successfully received by the second user equipment consecutively in the at least one PDCP PDU; or the first information is used to indicate a sequence number SN of a PDCP PDU following a PDCP PDU that is in PDCP PDUs successfully received by the second user equipment consecutively and that has a highest PDCP SN or a highest PDCP count value in the at least one PDCP PDU; or the first information is used to indicate a sequence number SN of a PDCP PDU following the last PDCP PDU that is in PDCP PDUs successfully received by the second user equipment consecutively.

With reference to either the example first user equipment apparatus or the foregoing possible implementation of the example first user equipment apparatus, in a second possible implementation of the example first user equipment apparatus, the first status report includes second information; and the second information is used to indicate a sequence number SN of a PDCP PDU that is successfully forwarded by the transmitter and that has a highest PDCP SN or a highest PDCP count value in the at least one PDCP PDU; or the second information is used to indicate a sequence number SN of a PDCP PDU following a PDCP PDU that is successfully forwarded by the transmitter and that has a highest PDCP SN or a highest PDCP count value in the at least one PDCP PDU; or the second information is used to indicate a sequence number of a PDCP PDU that is successfully received by the second user equipment and that has a highest PDCP SN or a highest PDCP count value in the at least one PDCP PDU; or the second information is a sequence number of a PDCP PDU following a PDCP PDU that is successfully received by the second user equipment and that has a highest PDCP SN or a highest PDCP count value in the at least one PDCP PDU.

With reference to any one of the example first user equipment apparatus or the foregoing possible implementations of the example first user equipment apparatus, in a third possible implementation of the example first user equipment apparatus, the first status report further includes third information, and the third information is a PDCP sequence number SN of a lost PDCP PDU in the at least one PDCP PDU forwarded by the sending unit to the second user equipment.

With reference to any one of the example first user equipment apparatus or the foregoing possible implementations of the example first user equipment apparatus, in a fourth possible implementation of the example first user equipment apparatus, the first status report includes fourth information, and the fourth information is a sequence number of the first lost PDCP PDU in the at least one PDCP PDU forwarded by the transmitter to the second user equipment; or the fourth information is a sequence number SN of the first PDCP PDU that is not received by the second user equipment in the at least one PDCP PDU forwarded by the transmitter to the second user equipment.

With reference to any one of the example first user equipment apparatus or the foregoing possible implementations of the example first user equipment apparatus, in a fifth possible implementation of the example first user equipment apparatus, the first status report further includes fifth information, and the fifth information is used to indicate a receiving status of a PDCP PDU after the first lost PDCP PDU or a receiving status of a PDCP PDU after the first PDCP PDU that is not received by the second user equipment.

With reference to any one of the example first user equipment apparatus or the foregoing possible implementations of the example first user equipment apparatus, in a sixth possible implementation of the example first user equipment apparatus, the first status report further includes at least one of sixth information and seventh information; the sixth information is a user equipment identifier of the second user equipment; and the seventh information is a radio bearer identifier of the second user equipment.

With reference to any one of the example first user equipment apparatus or the foregoing possible implementations of the example first user equipment apparatus, in a seventh possible implementation of the example first user equipment apparatus, the first status report is generated by one or more of an RLC layer, a PDCP, and an adaptation layer between the PDCP and the RLC of the apparatus.

With reference to any one of the example first user equipment apparatus or the foregoing possible implementations of the example first user equipment apparatus, in an eighth possible implementation of the example first user equipment apparatus, the apparatus further includes a receiver, and the receiver is configured to: before the transmitter sends the first status report to the network device, receive a second status report sent by the second user equipment, where the second status report is a radio link control layer status report, and the second status report is used to indicate a status of receiving an RLC PDU by the second user equipment.

With reference to any one of the example first user equipment apparatus or the foregoing possible implementations of the example first user equipment apparatus, in a ninth possible implementation of the example first user equipment apparatus, the determiner is specifically configured to determine, based on the second status report, the status of receiving the at least one PDCP PDU by the second user equipment.

According to a third aspect, a further example apparatus is disclosed and is disposed in user equipment, the user equipment is first user equipment, and the apparatus includes: a processor, configured to determine a status of receiving at least one packet data convergence protocol layer protocol data unit PDCP PDU by second user equipment, where the at least one PDCP PDU is forwarded by the first user equipment to the second user equipment by using a transmitter after being received by the first user equipment through a communications link between the first user equipment and a network device; and the transmitter, configured to send a first status report to the network device, where the first status report is used to indicate the status of receiving the at least one PDCP PDU by the second user equipment.

With reference to the further example first user equipment apparatus, in a first possible implementation of the further example first user equipment apparatus, the first status report includes first information; and the first information is used to indicate a sequence number SN of a PDCP PDU that is in PDCP PDUs successfully forwarded by the transmitter consecutively and that has a highest PDCP sequence number SN or a highest PDCP count count value in the at least one PDCP PDU; or the first information is used to indicate a sequence number SN of the last PDCP PDU that is in PDCP PDUs successfully forwarded by the transmitter consecutively in the at least one PDCP PDU; or the first information is used to indicate a sequence number SN of a PDCP PDU following a PDCP PDU that is in PDCP PDUs successfully forwarded by the transmitter consecutively and that has a highest PDCP SN or a highest PDCP count value in the at least one PDCP PDU; or the first information is used to indicate a sequence number SN of a PDCP PDU following the last PDCP PDU that is in PDCP PDUs successfully forwarded by the transmitter consecutively in the at least one PDCP PDU; or the first information is used to indicate a sequence number SN of a PDCP PDU that is in PDCP PDUs successfully received by the second user equipment consecutively and that has a highest PDCP SN or a highest PDCP count value in the at least one PDCP PDU; or the first information indicates a sequence number SN of the last PDCP PDU that is in PDCP PDUs successfully received by the second user equipment consecutively in the at least one PDCP PDU; or the first information is used to indicate a sequence number SN of a PDCP PDU following a PDCP PDU that is in PDCP PDUs successfully received by the second user equipment consecutively and that has a highest PDCP SN or a highest PDCP count value in the at least one PDCP PDU; or the first information is used to indicate a sequence number SN of a PDCP PDU following the last PDCP PDU that is in PDCP PDUs successfully received by the second user equipment consecutively.

With reference to either the further example first user equipment apparatus or the foregoing possible implementation of the further example first user equipment apparatus, in a second possible implementation of the further first user equipment example apparatus, the first status report includes second information; and the second information is used to indicate a sequence number SN of a PDCP PDU that is successfully forwarded by the transmitter and that has a highest PDCP SN or a highest PDCP count value in the at least one PDCP PDU; or the second information is used to indicate a sequence number SN of a PDCP PDU following a PDCP PDU that is successfully forwarded by the transmitter and that has a highest PDCP SN or a highest PDCP count value in the at least one PDCP PDU; or the second information is used to indicate a sequence number SN of a PDCP PDU that is successfully received by the second user equipment and that has a highest PDCP SN or a highest PDCP count value in the at least one PDCP PDU; or the second information is a sequence number SN of a PDCP PDU following a PDCP PDU that is successfully received by the second user equipment and that has a highest PDCP SN or a highest PDCP count value in the at least one PDCP PDU.

With reference to any one of the further example first user equipment apparatus or the foregoing possible implementations of the further example first user equipment apparatus, in a third possible implementation of the further example first user equipment apparatus, the first status report further includes third information, and the third information is a PDCP sequence number SN of a lost PDCP PDU in the at least one PDCP PDU forwarded by the transmitter to the second user equipment.

With reference to any one of the further example first user equipment apparatus or the foregoing possible implementations of the further example first user equipment apparatus, in a fourth possible implementation of the further example first user equipment apparatus, the first status report includes fourth information, and the fourth information is a sequence number SN of the first lost PDCP PDU in the at least one PDCP PDU forwarded by the transmitter to the second user equipment; or the fourth information is a sequence number SN of the first PDCP PDU that is not received by the second user equipment in the at least one PDCP PDU forwarded by the transmitter to the second user equipment.

With reference to any one of the further example first user equipment apparatus or the foregoing possible implementations of the further example first user equipment apparatus, in a fifth possible implementation of the further example first user equipment apparatus, the first status report further includes fifth information, and the fifth information is used to indicate a receiving status of a PDCP PDU after the first lost PDCP PDU or a receiving status of a PDCP PDU after the first PDCP PDU that is not received by the second user equipment.

With reference to any one of the further example first user equipment apparatus or the foregoing possible implementations of the further example first user equipment apparatus, in a sixth possible implementation of the further example first user equipment apparatus, the first status report further includes at least one of sixth information and seventh information; the sixth information is a user equipment identifier of the second user equipment; and the seventh information is a radio bearer identifier of the second user equipment.

With reference to any one of the further example first user equipment apparatus or the foregoing possible implementations of the further example first user equipment apparatus, in a seventh possible implementation of the further example first user equipment apparatus, the first status report is generated by one or more of an RLC layer, a PDCP, and an adaptation layer between the PDCP and the RLC of the apparatus.

With reference to any one of the further example first user equipment apparatus or the foregoing possible implementations of the further example first user equipment apparatus, in an eighth possible implementation of the further example first user equipment apparatus, the apparatus further includes a receiver, and the receiver is configured to: before the transmitter sends the first status report to the network device, receive a second status report sent by the second user equipment, where the second status report is a radio link control layer status report, and the second status report is used to indicate a status of receiving an RLC PDU by the second user equipment.

With reference to any one of the further example first user equipment apparatus or the foregoing possible implementations of the further example first user equipment apparatus, in a ninth possible implementation of the further example first user equipment apparatus, the processor is specifically configured to determine, based on the second status report, the status of receiving the at least one PDCP PDU by the second user equipment.

According to a fourth aspect, a further example data receiving status reporting method is disclosed and includes:

determining, by second user equipment, a status of receiving at least one PDCP SDU by the second user equipment, where the at least one PDCP SDU is forwarded by first user equipment to the second user equipment after being received by the first user equipment through a communications link between the first user equipment and a network device; and sending, by the second user equipment, a status report to the network device, where the status report is used to indicate the status of receiving the at least one PDCP SDU by the second user equipment.

With reference to the further example data receiving status reporting method, in a first possible implementation of the further example data receiving status reporting method, the status report includes first information; and the first information is used to indicate a sequence number SN of a PDCP SDU that is in PDCP SDUs successfully forwarded by the first user equipment consecutively and that has a highest PDCP sequence number SN or a highest PDCP count value in the at least one PDCP SDU; or the first information is used to indicate a sequence number SN of the last PDCP SDU that is in PDCP SDUs successfully forwarded by the first user equipment consecutively in the at least one PDCP SDU; or the first information is used to indicate a sequence number SN of a PDCP SDU following a PDCP SDU that is in PDCP SDUs successfully forwarded by the first user equipment consecutively and that has a highest PDCP SN or a highest PDCP count value in the at least one PDCP SDU; or the first information is used to indicate a sequence number SN of a PDCP SDU following the last PDCP SDU that is in PDCP SDUs successfully forwarded by the first user equipment consecutively in the at least one PDCP SDU; or the first information is used to indicate a sequence number SN of a PDCP SDU that is in PDCP SDUs successfully received by the second user equipment consecutively and that has a highest PDCP SN or a highest PDCP count value in the at least one PDCP SDU; or the first information indicates a sequence number SN of the last PDCP SDU that is in PDCP SDUs successfully received by the second user equipment consecutively in the at least one PDCP SDU; or the first information is used to indicate a sequence number SN of a PDCP SDU following a PDCP SDU that is in PDCP SDUs successfully received by the second user equipment consecutively and that has a highest PDCP SN or a highest PDCP count value in the at least one PDCP SDU; or the first information is used to indicate a sequence number SN of a PDCP SDU following the last PDCP SDU that is in PDCP SDUs successfully received by the second user equipment consecutively.

With reference to either the further example data receiving status reporting method or the foregoing possible implementation of the further example data receiving status reporting method, in a second possible implementation of the further example data receiving status reporting method, the status report includes second information; and the second information is used to indicate a sequence number SN of a PDCP SDU that is successfully forwarded by the first user equipment and that has a highest PDCP SN or a highest PDCP count value in the at least one PDCP SDU; or the second information is used to indicate a sequence number SN of a PDCP SDU following a PDCP SDU that is successfully forwarded by the first user equipment and that has a highest PDCP SN or a highest PDCP count value in the at least one PDCP SDU; or the second information is used to indicate a sequence number SN of a PDCP SDU that is successfully received by the second user equipment and that has a highest PDCP SN or a highest PDCP count value in the at least one PDCP SDU; or the second information is a sequence number SN of a PDCP SDU following a PDCP SDU that is successfully received by the second user equipment and that has a highest PDCP SN or a highest PDCP count value in the at least one PDCP SDU.

With reference to any one of the further example data receiving status reporting method or the foregoing possible implementations of the further example data receiving status reporting method, in a third possible implementation of the further example data receiving status reporting method, the status report further includes third information, and the third information is a PDCP sequence number SN of a lost PDCP SDU in the at least one PDCP SDU forwarded by the first user equipment to the second user equipment.

With reference to any one of the further example data receiving status reporting method or the foregoing possible implementations of the further example data receiving status reporting method, in a fourth possible implementation of the further example data receiving status reporting method, the status report includes fourth information, and the fourth information is a sequence number SN of the first lost PDCP SDU in the at least one PDCP SDU forwarded by the first user equipment to the second user equipment; or the fourth information is a sequence number SN of the first PDCP SDU that is not received by the second user equipment in the at least one PDCP SDU forwarded by the first user equipment to the second user equipment.

With reference to any one of the further example data receiving status reporting method or the foregoing possible implementations of the further example data receiving status reporting method, in a sixth possible implementation of the further example data receiving status reporting method, the status report further includes fifth information, and the fifth information is used to indicate a receiving status of a PDCP SDU after the first lost PDCP SDU or a receiving status of a PDCP SDU after the first PDCP SDU that is not received by the second user equipment.

With reference to any one of the further example data receiving status reporting method or the foregoing possible implementations of the further example data receiving status reporting method, in a seventh possible implementation of the further example data receiving status reporting method, the status report is generated by a PDCP of the second user equipment.

According to a fifth aspect, an example apparatus is disclosed and is disposed in user equipment, the user equipment is second user equipment, and the apparatus includes:

a processor, configured to determine a status of receiving at least one packet data convergence protocol layer protocol data unit PDCP PDU by the second user equipment, where the at least one PDCP PDU is forwarded by first user equipment to the second user equipment after being received by the first user equipment through a communications link between the first user equipment and a network device; and a transmitter, configured to send a status report to the network device, where the status report is used to indicate the status of receiving the at least one PDCP PDU by the second user equipment.

According to a sixth aspect of the example embodiments, a non-transitory computer storage medium is disclosed, and is configured to store a computer software instruction that is used by the foregoing apparatus disposed in the first user equipment. The computer software instruction includes a program used to perform the example data receiving status reporting method in the first aspect.

According to a seventh aspect of the example embodiments, another non-transitory computer storage medium is disclosed, and is configured to store a computer software instruction that is used by the foregoing apparatus disposed in the second user equipment. The computer software instruction includes a program used to perform the further example data receiving status reporting method in the fourth aspect.

BRIEF DESCRIPTION OF DRAWINGS

FIG. 6b is a schematic diagram of another frame structure of a first status report according to an example embodiment;

FIG. 7a is a schematic diagram of another frame structure of a first status report according to an example embodiment;

FIG. 7b is a schematic diagram of another frame structure of a first status report according to an example embodiment;

FIG. 8a is a schematic diagram of another frame structure of a first status report according to an example embodiment;

FIG. 8b is a schematic diagram of another frame structure of a first status report according to an example embodiment;

DESCRIPTION OF EMBODIMENTS

Figure 1:
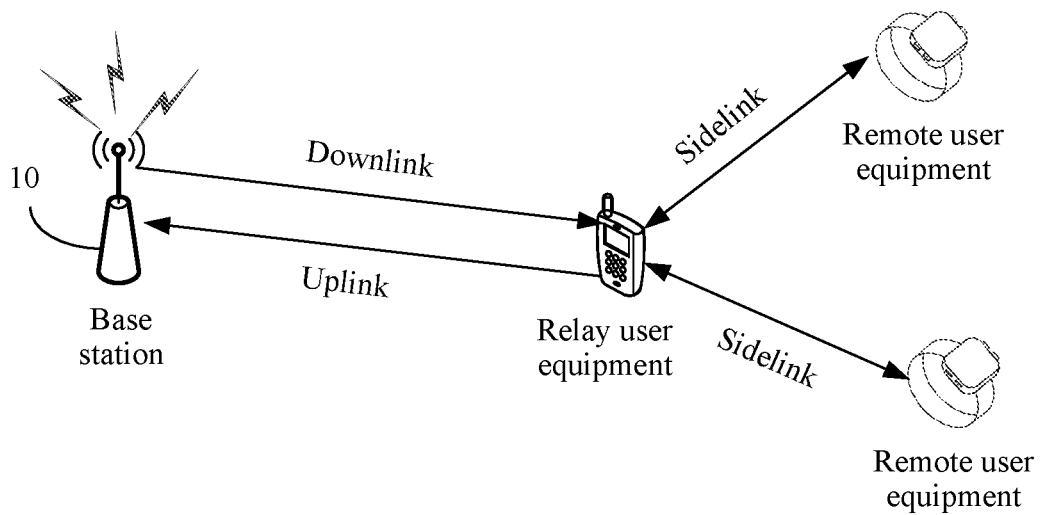
FIG. 1 is a prior art schematic diagram of two existing operating modes of communication between UE and a base station.

As shown in FIG. 1, there may be the following two modes for a connection between UE and a base station. 1. The UE is directly connected to the base station to perform data communication. This manner may be referred to as a direct communication mode. In this case, there is a direct path between the UE and the base station.

2. One user equipment is connected to the base station by using another user equipment to perform data communication. This mode may be referred to as a non-direct communication mode. In this case, the first user equipment may be referred to as remote user equipment (remote UE), the another user equipment may be referred to as relay user equipment (relay UE), and there is a non-direct path between the remote UE and the base station. In addition or alternative to a 3GPP sidelink/PC5 access technology, the remote UE and the relay UE may be connected by using a non-3GPP access technology, for example, a Bluetooth access technology or a WLAN access technology.

Figure 2:
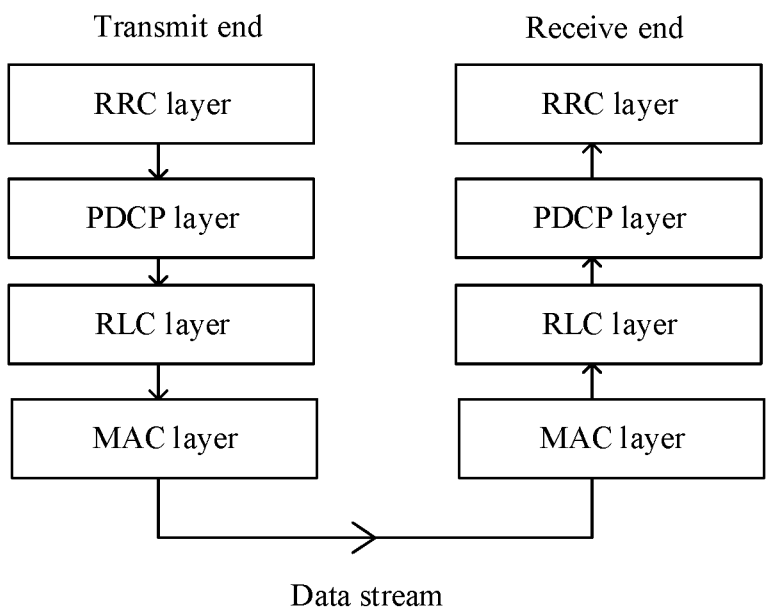
FIG. 2 is a schematic diagram of prior art existing radio interface protocol layer.

Referring to FIG. 2, in an LTE system, a radio interface includes a radio resource control ("RRC") protocol layer, a packet data convergence protocol ("PDCP") layer, a radio link control ("RLC") protocol layer, and a media access control ("MAC") protocol layer.

The RRC layer processes layer 3 information of a control plane between UE and a base station.

The PDCP layer is responsible for compressing and decompressing an IP header. On a user plane, after obtaining IP data packets from an upper layer, the PDCP layer may perform header compression and encryption on the IP data packets, maintain a sequence number (SN) for each obtained data packet, and then sequentially deliver the data packets to the RLC layer.

The RLC layer mainly performs segmentation and/or concatenation on the received upper-layer data packet, so that data packets obtained after the segmentation and/or concatenation are suitable for actual transmission on the radio interface. In addition, for a radio bearer ("RB") that requires errorless transmission, the RLC layer protocol may further recover a lost data packet by using a retransmission mechanism. For example, at a transmit end, the RLC layer receives PDCP PDUs whose SNs are 0, 1, and 2 and that are transmitted by the PDCP layer, and may perform segmentation and/or concatenation on the three PDCP PDUs to obtain two RLC PDUs whose numbers are 0 and 1. At a receive end, the RLC layer may perform segmentation and/or concatenation on the received RLC PDUs to obtain the three PDCP PDUs whose SNs are 0, 1, and 2.

The MAC layer defines how a data frame is transmitted on a medium.

Figure 3A:
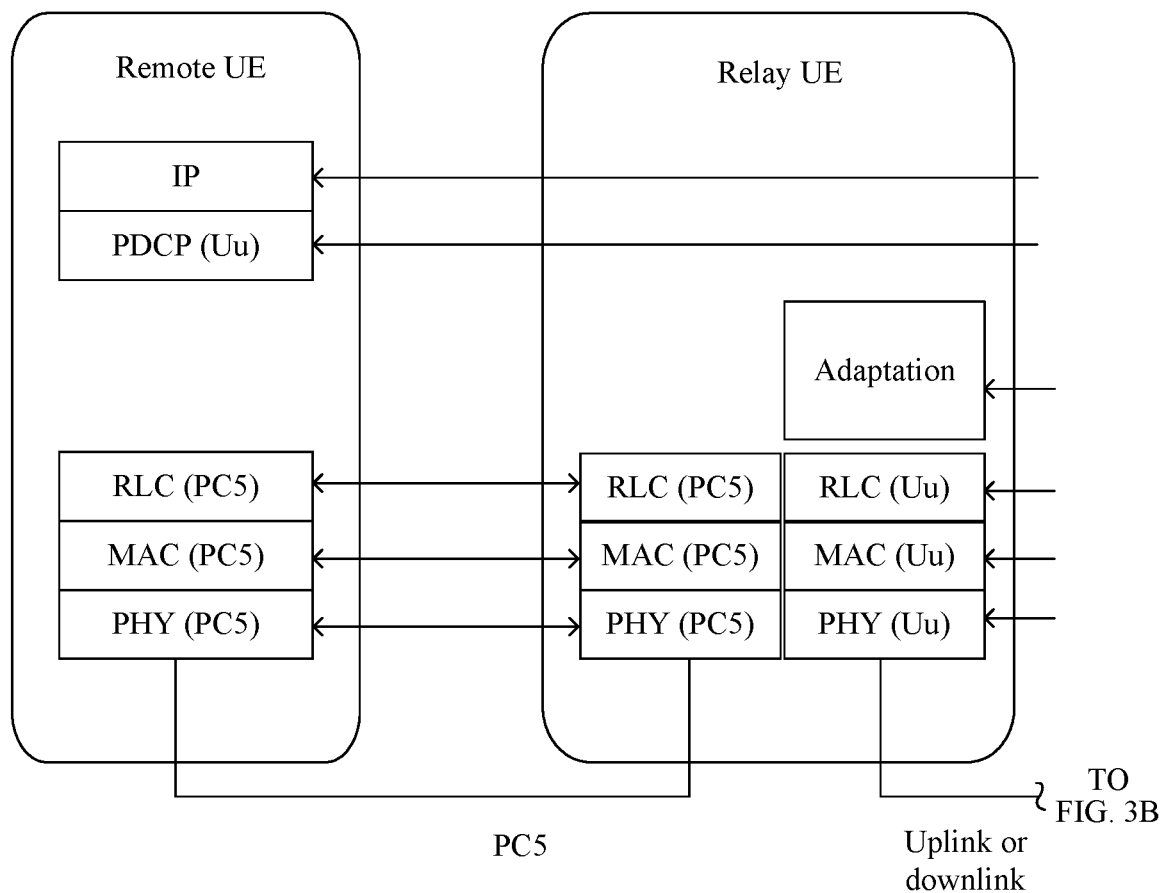
FIG. 3A and FIG. 3B are a schematic diagram of a prior art end-to-end protocol stack in an existing non-direct communication mode.
Figure 3B:
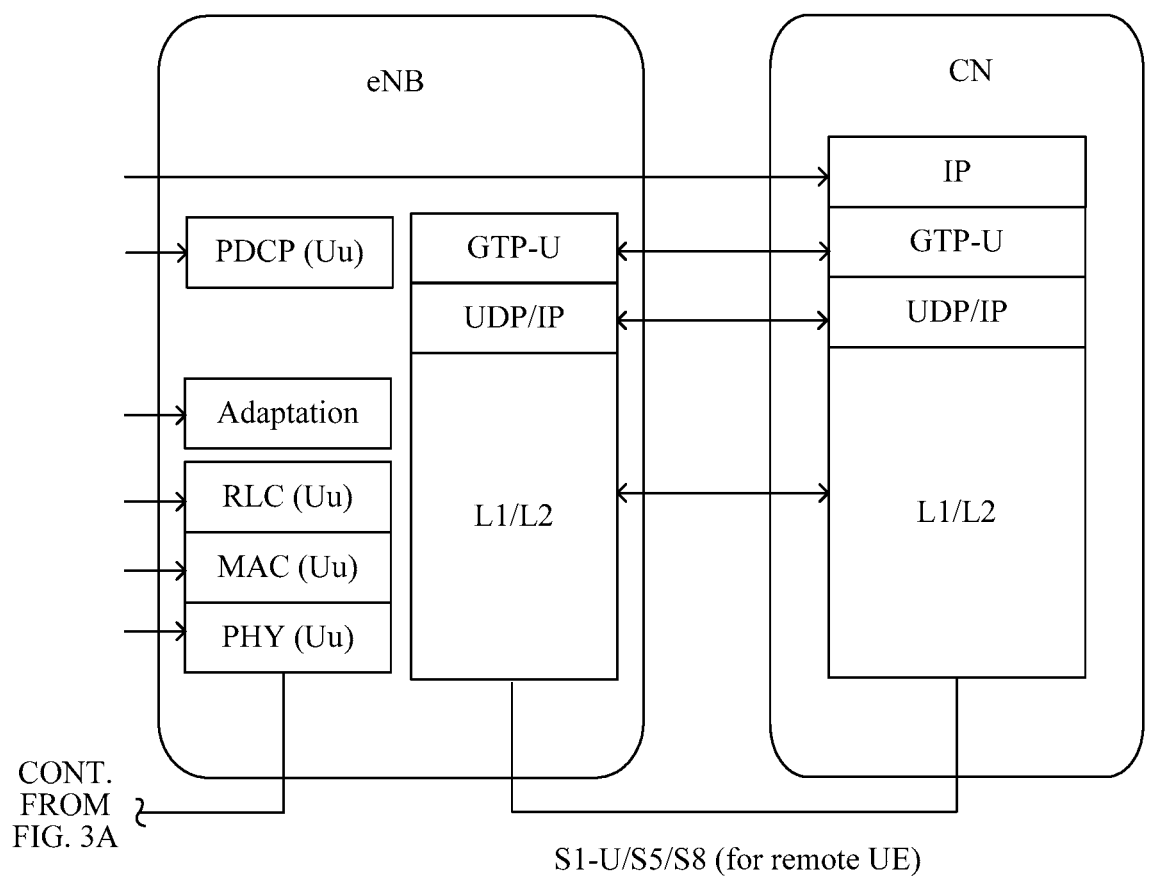

In the non-direct communication mode shown in FIG. 1, when the remote UE is connected to a network by using the relay UE, and the remote UE is connected to the relay UE by using the 3GPP access technology, an end-to-end protocol stack of a user plane corresponding to the remote UE is shown in FIG. 3A and FIG. 3B. An interface of a link between the relay UE and the remote UE is referred to as PC5, and a corresponding link is a sidelink. An interface of a link between the relay UE and the base station is Uu, and a corresponding link includes a downlink or an uplink. Referring to FIG. 3A and FIG. 3B, at a transmit end (for example, the base station), each layer receives a service data unit (SDU) from a higher layer, and outputs a protocol data unit (PDU) to a lower layer. For example, an RLC (Uu) of the base station receives packets from a PDCP (Uu) of the base station. These packets are PDCP PDUs from the perspective of the PDCP, or are RLC SDUs from the perspective of the RLC. At a receive end (for example, the relay UE), this process is in reverse. Each layer sends an SDU to an upper layer, and the upper layer receives the SDU as a PDU. For example, a PDCP (Uu) of the relay UE receives packets from an RLC (Uu) of the relay UE. These packets are PDCP PDUs from the perspective of the PDCP, or are RLC SDUs from the perspective of the RLC.

Usually, different RLC modes may be configured for each RLC entity (for example, an RLC (Uu) and an RLC (PC5) in FIG. 3A and FIG. 3B) depending on service types. The RLC modes specifically include a transparent mode ("TM"), an unacknowledged mode ("UM"), and an acknowledged mode ("AM"). When the RLC mode of the RLC entity is configured as the AM, an RLC entity on a sending side first sequentially concatenates pre-buffered RLC service data units (SDUs) to obtain a data field in an RLC PDU based on a transmission opportunity notified by the media access control (MAC) layer and a size of a data packet that can be sent; constructs header information corresponding to the data field based on a protocol requirement, where the data field and the header information form a complete RLC PDU; and then sends the RLC PDU to an RLC entity on a receiving side. The header information of the RLC PDU includes one SN, and the SN is increased by 1 each time one new RLC PDU is sent.

In addition, after receiving some RLC PDUs, the RLC entity on the receiving side sends an RLC status report to the RLC entity on the sending side according to a feedback mechanism, where the status report includes an SN of an RLC PDU that is to be retransmitted by the RLC entity on the sending side. After receiving the status report, the RLC entity on the sending side is to retransmit, based on the current transmission opportunity and the size of the data packet that can be sent, the RLC PDU that is to be retransmitted.

Referring to FIG. 1, the remote UE may switch between two connection modes or two communication paths. For example, when quality of a link between UE and the base station is relatively poor, the UE may choose to connect to the base station by using nearby relay UE. In this case, switching from the direct communication mode to the non-direct communication mode is performed. For another example, when the relay UE connected to the remote UE moves, a connection between the remote UE and the relay UE may no longer be maintained. In this case, switching from the non-direct communication mode to the direct communication mode is performed.

In downlink data transmission, the base station first sends, to the relay UE, data that is to be sent to the remote UE. An RLC (Uu) entity of the relay UE sends an RLC status report to the base station. The RLC status report is carried on an RLC status PDU. For a format of the RLC status PDU, refer to the radio link control (RLC) protocol specification in TS 36.322. The status report includes a receiving status of an RLC PDU. After receiving the status report fed back by the RLC entity of the relay UE, the base station may determine, based on the status report, an RLC sequence number of an RLC PDU that has been successfully received by the relay UE and an RLC sequence number of a lost RLC PDU. Based on the sequence number SN of the RLC PDU and a segmentation status and a concatenation status of the RLC SDU during data sending, the base station may determine an RLC SDU of the remote UE successfully received by the relay UE and a lost RLC SDU, and may further determine a PDCP sequence number of a PDCP PDU/PDCP SDU of the remote UE successfully received by the relay UE.

After the relay UE forwards data of the remote UE to the remote UE, an RLC (PC5) entity of the remote UE feeds back an RLC status report to an RLC (PC5) entity of the relay UE. After receiving the status report fed back by the RLC entity of the remote UE, the relay UE may determine, based on the status report, an RLC sequence number SN of an RLC PDU that has been successfully received by the remote UE and an RLC sequence number of a lost RLC PDU. Based on the sequence number SN of the RLC PDU and a segmentation status and a concatenation status of the RLC SDU during data sending, the relay UE may determine an RLC SDU of the remote UE successfully received by the remote UE and a lost RLC SDU, and may further determine a PDCP sequence number of a PDCP PDU/PDCP SDU successfully received by the remote UE in PDCP PDUs/PDCP SDUs that are to be sent by the base station to the remote UE, and a sequence number SN of a lost PDCP PDU/PDCP SDU of the remote UE in the PDCP PDUs/PDCP SDUs that are to be sent by the base station to the remote UE.

However, in a process of transmitting downlink data in the non-direct communication mode, the base station cannot know a PDCP sequence number SN of a PDCP PDU/PDCP SDU of the remote UE successfully received by the remote UE in the data sent to the remote UE and a sequence number SN of a lost PDCP PDU/PDCP SDU of the remote UE.

Consequently, downlink data of the remote UE is lost. Specifically, there may be the following three cases:

Case 1: In a process in which the base station normally transmits downlink data by using the non-direct communication path, because the base station does not know a transmission status of data between the relay UE and the remote UE, a communication rate of the link between the base station and the relay UE may be far higher than a communication rate of the link between the relay UE and the remote UE. Therefore, the relay UE is to buffer a large quantity of data packets forwarded to the remote UE. When the amount of data packets that are to be buffered exceed a buffer capability of the relay UE, the relay UE discards an extra data packet. Consequently, a downlink data packet of the remote UE is lost.

Case 2: The base station forwards the downlink data of the remote UE by using the relay UE. After the base station sends the data to the relay UE, the base station may know, based on a status report fed back by an RLC layer of the relay UE, which downlink data has been correctly received by the relay UE, and which data has not been received by the relay UE. However, the base station does not know which data packets forwarded by the relay UE have been successfully received by the remote UE, and which data packets have not been successfully received by the remote UE. Based on the status report fed back by the RLC layer of the relay UE, the base station may clear, from a sending buffer, a data packet that has been correctly received by the relay UE. In this way, after the communication path between the remote UE and the base station is switched from the non-direct path to the direct path (in other words, the remote UE is directly connected to the base station for communication), because the relay UE cannot forward the downlink data to the remote UE, the remote UE can receive, only from the base station, data that has not been successfully received. In this case, for data packets that have been cleared by the base station from the sending buffer but have not been correctly received by the remote UE, the remote UE cannot obtain these data packets from the base station by using the direct path. Consequently, a downlink data packet of the remote UE is lost.

Case 3: After the remote UE is switched from the non-direct path to the direct path (in other words, the remote UE is directly connected to the base station for communication), downlink PDCP SDUs received from the base station may be received out of order. However, in a normal data receiving process, a PDCP layer of the remote UE directly delivers the received PDCP SDUs to an upper layer without reordering the received PDCP SDUs. Therefore, data packets delivered by the PDCP to the upper layer are out-of-order. Out-of-order delivery to the upper layer may lead to a data packet loss at the upper layer.

A feature of this example embodiment is as follows: When there is a non-direct path between the remote UE and the base station, the base station sends at least one data packet to the remote UE by using the relay UE, and the relay UE determines a status of receiving the at least one data packet by the remote UE, and reports, to the base station, the status of receiving the at least one data packet by the remote UE. Alternatively, when there is a non-direct path between the remote UE and the base station, the base station sends at least one data packet to the remote UE by using the relay UE, and the remote UE reports a receiving status of the at least one data packet to the base station.

In this way, based on a status that is of receiving downlink data by the remote UE and that is reported by the relay UE or a receiving status of downlink data that is reported by the remote UE, the base station may determine which downlink data transmitted to the remote UE by using the relay UE has been successfully received by the remote UE, and which downlink data has not been successfully received by the remote UE.

For the foregoing Case 1, in a process of transmitting data in the non-direct communication mode, the base station may adjust a transmission rate of the link between the base station and the relay UE based on a status of receiving a downlink data packet by the remote UE, thereby avoiding a packet loss in Case 1.

For the foregoing Case 2, in a process of transmitting data in the non-direct communication manner, the base station may determine, based on a status of receiving a downlink data packet by the remote UE, which data packets may be deleted from the sending buffer. Therefore, after the remote UE is switched from the non-direct path to the direct path, a packet loss in Case 2 is avoided.

For the foregoing Case 3, after the remote UE is switched from the non-direct path to the direct path, the base station may sequentially perform retransmission based on a status of receiving a downlink data packet by the remote UE. Therefore, the PDCP of the remote UE also sequentially receives data, and sequentially delivers the received data to a higher layer. Therefore, a packet loss in Case 3 can be avoided.

Figure 4:
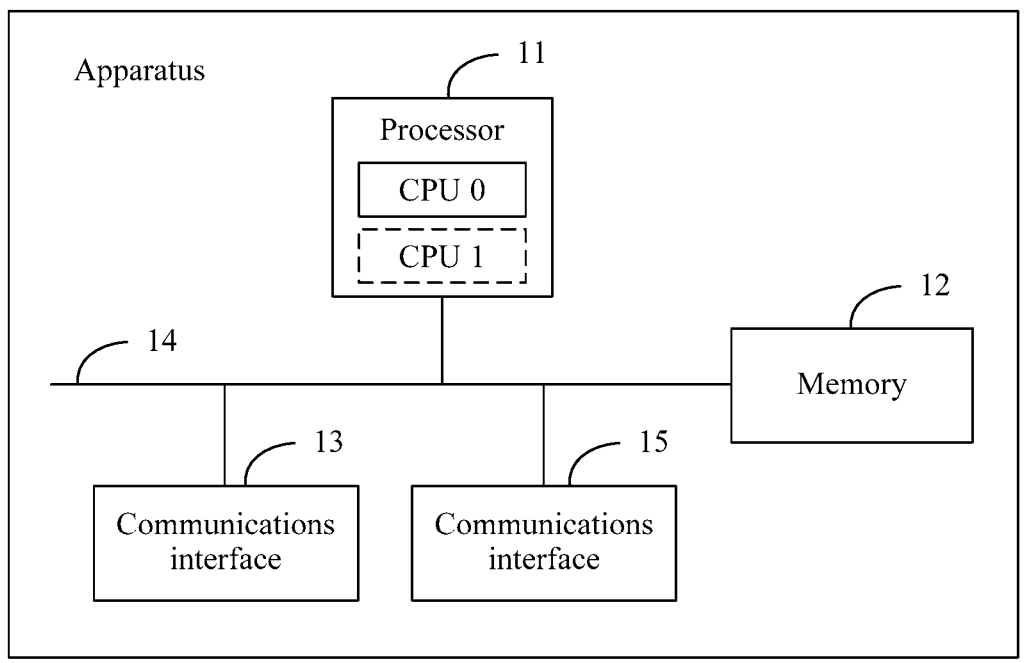
FIG. 4 is a schematic structural diagram of an apparatus according to an example embodiment.

In a specific example implementation, FIG. 4 is a schematic composition diagram of user equipment according to an example embodiment. The user equipment may be the first user equipment in the embodiments, or may be the relay user equipment in the communications system shown in FIG. 1. As shown in FIG. 4, the user equipment may include at least one processor 11, a memory 12, a communications interface 13, a communications interface 15, and a communications bus 14.

Constituent parts of the user equipment are described in detail below with reference to FIG. 4.

The processor 11 is a control center of the user equipment, and may be one processor, or may be a collective name of a plurality of processing elements. For example, the processor 11 is a central processing unit (CPU), or may be an application-specific integrated circuit (ASIC), or may be configured as one or more integrated circuits implementing this embodiment, for example, one or more microprocessors, digital signal processors (DSPs) or one or more field programmable gate arrays (FPGAs).

The processor 11 may implement various functions of the user equipment by running or executing a software program stored in the non-transitory memory 12 and invoking data stored in the memory 12.

In specific implementation, as an embodiment, the processor 11 may include one or more CPUs, for example, a CPU 0 and a CPU 1 shown in FIG. 4.

In a specific example implementation, the user equipment may include a plurality of processors, for example, the processor 11 and a processor 15 shown in FIG. 4. Each of these processors may be a single-core processor (single-CPU), or may be a multi-core processor (multi-CPU). The processor herein may be one or more devices, circuits, and/or processing cores used to process data (such as a computer program instructions).

The memory 12 may be a read-only memory (read-only memory, ROM), another type of static storage device that may store static information and instructions, a random access memory (RAM), or another type of dynamic storage device that may store information and instructions; or may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a Blu-ray disc, and the like), a magnetic disk storage medium or another magnetic storage device, or any other medium that can be configured to carry or store program code in a form of an instruction or a data structure and that can be accessed by a computer. This does not constitute a limitation herein. The memory 12 may exist independently, and is connected to the processor 11 through the communications bus 14. Alternatively, the memory 12 may be integrated with the processor 11.

The memory 12 is configured to store a software program, and the processor 11 controls execution of the software program.

The communications interface 13 and the communications interface 15 are configured to communicate, by using any apparatus such as a transceiver, with another device or a communications network such as an Ethernet, a radio access network (RAN), or a wireless local area network (WLAN). The communications interface 13 is a communications interface between a UE and a network device, and the communications interface 15 is a communications interface between a relay UE and a remote UE. The communications interface 13 and the communications interface 15 may include a receiver for implementing a receiving function and a transmitter or sender for implementing a sending function.

The communications bus 14 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of indication, the bus is indicated by using only one bold line in FIG. 4. However, the single line does not indicate that there is only one bus or only one type of bus.

The structure of the device shown in FIG. 4 does not constitute a limitation on the user equipment. The user equipment may include more or fewer components than those shown in the diagram, combine some components, or have different component arrangements.

In some example embodiments, the communications interface 13 receives, by using a data radio bearer (DRB) between the communications interface 13 and the network device, at least one PDCP PDU sent by the network device to second user equipment. The network device herein may be a base station, for example, the base station in the communications system shown in FIG. 1. The second user equipment herein may be user equipment that is not directly connected to the base station and that is to communicate with the base station through relay by the first user equipment, for example, the relay user equipment in the communications system shown in FIG. 1.

Subsequently, the communications interface 15 forwards the at least one PDCP PDU to the second user equipment by using a sidelink radio bearer (SL-RB) or a non-3GPP link between the first user equipment (user equipment in which the apparatus shown in FIG. 4 is disposed) and the second user equipment.

When the first user equipment is connected to the second user equipment by using a sidelink technology, further, after receiving some RLC PDUs that carry the PDCP PDU forwarded by the first user equipment, an RLC entity of the second user equipment sends an RLC status report (a second status report in this example embodiment) to the first user equipment, to indicate a status of receiving the RLC PDU by the second user equipment. The communications interface 15 of the first user equipment receives the second status report. It should be noted that an RLC entity of the communications interface 15 of the first user equipment, namely, an RLC entity (referred to as a first RLC entity of the first user equipment below) of a radio bearer of a sidelink between the first user equipment and the second user equipment, may perform segmentation and/or concatenation on a received PDCP PDU/RLC SDU that is to be forwarded to the second user equipment, to obtain an RLC PDU, and then forward the RLC PDU to the second user equipment. Therefore, the second user equipment reports a receiving status of the RLC PDU. For example, for an RLC PDU, if a receiving status of the RLC PDU in an RLC status report reported by the second user equipment is acknowledge (ACK), it indicates that the RLC PDU is successfully received by the second user equipment. On the contrary, if a receiving status of the RLC PDU in an RLC status report is not acknowledge (NACK), it indicates that the RLC PDU is not successfully received by the second user equipment. In other words, the second user equipment fails to receive the RLC PDU.

After receiving the RLC status report sent by the second user equipment, the first user equipment may determine, based on the status of receiving the RLC PDU by the second user equipment, a status of receiving the at least one PDCP PDU by the second user equipment. In a specific example implementation, the processor 11 of the first user equipment determines, based on the status of receiving the RLC PDU by the second user equipment, the status of receiving the at least one PDCP PDU by the second user equipment. Specifically, the RLC entity of the first user equipment performs segmentation and/or concatenation on the at least one PDCP PDU/RLC SDU to obtain an RLC PDU, and then forwards the RLC PDU to the second user equipment. Therefore, the first user equipment may determine, based on the status of receiving the RLC PDU by the second user equipment, the status of receiving the at least one PDCP PDU by the second user equipment. For example, the first RLC entity of the first user equipment receives PDCP PDUs, whose PDCP SNs are 0, 1, and 2, that are transmitted by an adaptation layer entity of the first user equipment and that are to be forwarded to the second user equipment. The adaptation layer is above an interface between the first user equipment and the network device in FIG. 3A and FIG. 3B. Based on a size of an available transmission resource on the sidelink, the first RLC entity of the first user equipment may perform segmentation and/or concatenation on the three PDCP PDUs/ RLC SDUs to obtain two RLC PDUs whose RLC numbers are 0 and 1. If receiving statuses of the two RLC PDUs whose numbers are 0 and 1 in an RLC status report fed back by the second user equipment are ACK, the two RLC PDUs are successfully received by the second user equipment, and the first user equipment may determine that all the three PDCP PDUs whose SNs are 0, 1, and 2 are successfully received by the second user equipment.

The first user equipment may generate a first status report based on the status of the second user equipment receiving the at least one PDCP PDU and that is determined based on the second status report, and send the first status report to the network device through the communications interface 13, where the first status report is used to indicate the status of the second user equipment receiving the at least one PDCP PDU.

The first status report is triggered in the following three ways:

2. After receiving the second status report, the first user equipment triggers and generates the first status report.

Specifically, after receiving the second status report, the first RLC entity of the first user equipment determines, based on the second status report, the status of receiving the at least one PDCP PDU by the second user equipment, and notifies the adaptation layer entity above the interface between the first user equipment and the network device of the receiving status. The adaptation layer entity triggers and generates the second status report.

2. The first user equipment periodically triggers the first status report. The period length is configured by the base station. Specifically, the first user equipment maintains at least one timer. When the first user equipment receives the period length configured by the base station, the first user equipment starts the timer. When the timer expires, the adaptation layer entity of the first user equipment triggers and generates the first status report. For the timer, the first user equipment may maintain a common timer for second user equipment connected to the first user equipment. When the timer expires, the first user equipment triggers and generates first status reports of all radio bearers of all the second user equipment. Alternatively, the first user equipment maintains one timer for each second user equipment connected to the first user equipment. When the timer expires, the first user equipment triggers and generates first status reports of all radio bearers of corresponding second user equipment; or the first user equipment maintains one timer for each radio bearer of each second user equipment connected to the first user equipment. When the timer expires, the first user equipment triggers and generates a first status report of a corresponding radio bearer of corresponding second user equipment.

3. The first user equipment triggers the first status report based on indication information of the base station. After the first user equipment receives the indication information of the base station, the adaptation layer entity of the first user equipment triggers a first status report of a corresponding radio bearer of corresponding second user equipment. In an example implementation, the indication is included in an adaptation layer PDU sent by the base station to the first user equipment. The indication may be 1-bit information. For example, the 1 bit may be referred to as a poll bit. In addition, the adaptation layer PDU sent by the base station to the first user equipment further includes a second user equipment identifier corresponding to the adaptation layer PDU and a radio bearer identifier of the second user equipment. When a value of the 1-bit information in the adaptation layer PDU received by the first user equipment is set to 1, it indicates that the first user equipment is to trigger the first status report of the corresponding radio bearer of the corresponding second user equipment. However, when a value of the 1-bit information in the adaptation layer PDU received by the first user equipment is set to 0, it indicates that the first user equipment does not trigger the first status report of the corresponding radio bearer of the corresponding second user equipment, or vice versa.

In the foregoing description, the first status report is triggered by the adaptation layer. However, if the adaptation layer is not an independent protocol layer, but serves as a sub-layer or a sub-function module of a PDCP layer between the first user equipment and the second user equipment, the first status report is finally triggered by the PDCP layer, and correspondingly, the first status report is about a PDCP PDU.

In addition, the first status report may be alternatively triggered by an RLC layer between the first user equipment and the second user equipment, and correspondingly, the first status report is about an RLC PDU.

The following describes information included in the first status report in detail with reference to an example. In specific implementation, the first status report is implemented in the following four ways.

First, it is assumed that the base station is to forward 10 PDCP PDUs whose SNs are sequentially 0 to 9 to the second user equipment by using the first user equipment. The first user equipment determines, based on the second status report fed back by the second user equipment, that the second user equipment receives PDCP PDUs whose SNs are 0 to 5 and a PDCP PDU whose SN is 9. In other words, the second user equipment fails to receive PDCP PDUs whose SNs are 6 to 8.

1. In some embodiments, the first status report includes first information, and the first information is used to indicate a sequence number SN of a PDCP PDU that is in PDCP PDUs successfully forwarded by the first user equipment consecutively and that has a highest PDCP sequence number SN or a highest PDCP count value in the at least one PDCP PDU. "Consecutively successful forwarding" may be understood as that N PDCP PDUs successfully forwarded in ascending order of SNs are consecutive, and there is no lost PDCP PDU in the N PDCP PDUs during forwarding. In addition, "successful forwarding" means that the second user equipment receives a PDCP PDU forwarded by the first user equipment. In the foregoing example, the first user equipment determines that SNs of PDCP PDUs received by the second user equipment are 0, 1, 2, 3, 4, 5, and 9. Therefore, SNs of PDCP PDUs successfully forwarded by the first user equipment are 0, 1, 2, 3, 4, 5, and 9. Further, "a sequence number of a PDCP PDU that is in PDCP PDUs successfully forwarded by the first user equipment consecutively and that has a highest PDCP sequence number SN or a highest PDCP count value" is 5.

Alternatively, the first information is used to indicate a sequence number SN of the last PDCP PDU that is in PDCP PDUs successfully forwarded by the first user equipment consecutively in the at least one PDCP PDU. In the foregoing example, the first user equipment determines that SNs of PDCP PDUs received by the second user equipment are 0, 1, 2, 3, 4, 5, and 9. Therefore, "a sequence number of the last PDCP PDU that is in PDCP PDUs successfully forwarded by the first user equipment consecutively" is 5.

Alternatively, the first information is used to indicate a sequence number of a PDCP PDU following a PDCP PDU that is in PDCP PDUs successfully forwarded by the first user equipment consecutively and that has a highest PDCP SN or a highest PDCP count value in the at least one PDCP PDU. In the foregoing example, the first user equipment determines that SNs of PDCP PDUs received by the second user equipment are 0, 1, 2, 3, 4, 5, and 9, and "a sequence number of the last PDCP PDU that is in PDCP PDUs successfully forwarded by the first user equipment consecutively" is 5. Therefore, "a sequence number of a PDCP PDU following a PDCP PDU that is in PDCP PDUs successfully forwarded by the first user equipment consecutively and that has a highest PDCP SN or a highest PDCP count value" is 6.

Alternatively, the first information is used to indicate a sequence number SN of a PDCP PDU following the last PDCP PDU that is in PDCP PDUs successfully forwarded by the first user equipment consecutively in the at least one PDCP PDU. In the foregoing example, the first user equipment determines that SNs of PDCP PDUs received by the second user equipment are 0, 1, 2, 3, 4, 5, and 9, and "the last PDCP PDU that is in PDCP PDUs successfully forwarded by the first user equipment consecutively" is 5.

Therefore, "a sequence number of a PDCP PDU following the last PDCP PDU that is in PDCP PDUs successfully forwarded by the first user equipment consecutively" is 6.

Alternatively, the first information is used to indicate a sequence number SN of a PDCP PDU that is in PDCP PDUs successfully received by the second user equipment consecutively and that has a highest PDCP SN or a highest PDCP count value in the at least one PDCP PDU. In the foregoing example, the first user equipment determines that SNs of PDCP PDUs received by the second user equipment are 0, 1, 2, 3, 4, 5, and 9, and SNs of PDCP PDUs successfully received by the second user equipment consecutively are 0, 1, 2, 3, 4, and 5. Therefore, "a sequence number of a PDCP PDU that is in PDCP PDUs successfully forwarded by the first user equipment consecutively and that has a highest PDCP sequence number SN or a highest PDCP count value" is 5.

Alternatively, the first information indicates a sequence number SN of the last PDCP PDU that is in PDCP PDUs successfully received by the second user equipment consecutively in the at least one PDCP PDU. In the foregoing example, the first user equipment determines that SNs of PDCP PDUs received by the second user equipment are 0, 1, 2, 3, 4, 5, and 9, and SNs of PDCP PDUs successfully received by the second user equipment consecutively are 0, 1, 2, 3, 4, and 5. Therefore, "a sequence number of the last PDCP PDU that is in PDCP PDUs successfully received by the second user equipment consecutively" is 5.

Alternatively, the first information is used to indicate a sequence number SN of a PDCP PDU following a PDCP PDU that is in PDCP PDUs successfully received by the second user equipment consecutively and that has a highest PDCP SN or a highest PDCP count value in the at least one PDCP PDU. In the foregoing example, the first user equipment determines that SNs of PDCP PDUs received by the second user equipment are 0, 1, 2, 3, 4, 5, and 9, and SNs of PDCP PDUs successfully received by the second user equipment consecutively are 0, 1, 2, 3, 4, and 5. A sequence number of the PDCP PDU that is in the PDCP PDUs successfully received by the second user equipment consecutively and that has the highest PDCP SN or the highest PDCP count value is 5. Therefore, "a sequence number of a PDCP PDU following a PDCP PDU that is in PDCP PDUs successfully received by the second user equipment consecutively and that has a highest PDCP SN or a highest PDCP count value" is 6.

Alternatively, the first information is used to indicate a sequence number SN of a PDCP PDU following the last PDCP PDU that is in PDCP PDUs successfully received by the second user equipment consecutively. In the foregoing example, the first user equipment determines that SNs of PDCP PDUs received by the second user equipment are 0, 1, 2, 3, 4, 5, and 9, and SNs of PDCP PDUs successfully received by the second user equipment consecutively are 0, 1, 2, 3, 4, and 5. A sequence number of the last PDCP PDU that is in the PDCP PDUs successfully received by the second user equipment consecutively is 5. Therefore, "a sequence number of a PDCP PDU following the last PDCP PDU that is in PDCP PDUs successfully received by the second user equipment consecutively" is 6.

2. In some embodiments, the first status report includes second information. The second information is used to indicate a sequence number SN of a PDCP PDU that is successfully forwarded by the first user equipment and that has a highest PDCP SN or a highest PDCP count value in the at least one PDCP PDU. In the foregoing example, the first user equipment determines that SNs of PDCP PDUs received by the second user equipment are 0, 1, 2, 3, 4, 5, and 9. In other words, SNs of PDCP PDUs successfully forwarded by the first user equipment are 0, 1, 2, 3, 4, 5, and 9. Therefore, "a sequence number of a PDCP PDU that is successfully forwarded by the first user equipment and that has a highest PDCP SN or a highest PDCP count value" is 9.

Alternatively, the second information is used to indicate a sequence number SN of a PDCP PDU following a PDCP PDU that is successfully forwarded by the first user equipment and that has a highest PDCP SN or a highest PDCP count value in the at least one PDCP PDU. In the foregoing example, the first user equipment determines that SNs of PDCP PDUs received by the second user equipment are 0, 1, 2, 3, 4, 5, and 9. In other words, SNs of PDCP PDUs successfully forwarded by the first user equipment are 0, 1, 2, 3, 4, 5, and 9. Therefore, "a sequence number of a PDCP PDU following a PDCP PDU that is successfully forwarded by the first user equipment and that has a highest PDCP SN or a highest PDCP count value" is 10.

Alternatively, the second information is used to indicate a sequence number SN of a PDCP PDU that is successfully received by the second user equipment and that has a highest PDCP SN or a highest PDCP count value in the at least one PDCP PDU. In the foregoing example, the first user equipment determines that SNs of PDCP PDUs received by the second user equipment are 0, 1, 2, 3, 4, 5, and 9. Therefore, "a sequence number of a PDCP PDU that is successfully received by the second user equipment and that has a highest PDCP SN or a highest PDCP count value" is 9.

Alternatively, the second information is a sequence number SN of a PDCP PDU following a PDCP PDU that is successfully received by the second user equipment and that has a highest PDCP SN or a highest PDCP count value in the at least one PDCP PDU. In the foregoing example, the first user equipment determines that SNs of PDCP PDUs received by the second user equipment are 0, 1, 2, 3, 4, 5, and 9. "A sequence number of a PDCP PDU that is successfully received by the second user equipment and that has a highest PDCP SN or a highest PDCP count value" is 5. Therefore, "a sequence number of a PDCP PDU following a PDCP PDU that is successfully received by the second user equipment and that has a highest PDCP SN or a highest PDCP count value" is 10.

Further, the second information is used to indicate a PDCP PDU with a highest sequence number SN in PDCP PDUs received by the second user equipment, and further indicate a receiving status of a PDCP PDU whose sequence number SN is lower than that of the PDCP PDU, for example, indicating which PDCP PDU whose sequence number is lower than that of the PDCP PDU is lost or is not received by the second user equipment. The first status report further includes third information, and the third information is used to indicate a PDCP sequence number of a lost PDCP PDU in the at least one PDCP PDU forwarded by the first user equipment to the second user equipment. It should be noted that the "lost PDCP PDU" may be considered as a PDCP PDU that is to be received but is not received by the second user equipment. In the foregoing example, the first user equipment determines that SNs of PDCP PDUs received by the second user equipment are 0, 1, 2, 3, 4, 5, and 9, and SNs of lost PDCP PDUs are 6, 7, and 8. Therefore, the third information is used to indicate the sequence numbers 6, 7, and 8.

3. In some embodiments, the first status report includes fourth information, and the fourth information is a sequence number SN of the first lost PDCP PDU in the at least one PDCP PDU forwarded by the first user equipment to the second user equipment. In the foregoing example, the first user equipment determines that SNs of PDCP PDUs received by the second user equipment are 0, 1, 2, 3, 4, 5, . . . , and 9, and SNs of lost PDCP PDUs are 6, 7, and 8 in a process of forwarding from the first user equipment to the second user equipment. Therefore, it is determined that "a sequence number of the first lost PDCP PDU in the at least one PDCP PDU forwarded by the first user equipment to the second user equipment" is 6.

Alternatively, the fourth information is a sequence number SN of the first PDCP PDU that is not received by the second user equipment in the at least one PDCP PDU forwarded by the first user equipment to the second user equipment. In the foregoing example, the first user equipment determines that SNs of PDCP PDUs received by the second user equipment are 0, 1, 2, 3, 4, 5, . . . , and 9, and SNs of PDCP PDUs of the second user equipment are 6, 7, and 8 in a process of forwarding from the first user equipment to the second user. Therefore, it is determined that "a sequence number of the first PDCP PDU that is not received by the second user equipment in the at least one PDCP PDU" is 6.

Further, after the first lost PDCP PDU in all PDCP PDUs received by the second user equipment is indicated by using the fourth information, a receiving status of a PDCP PDU after the PDCP PDU, namely, a receiving status of a PDCP PDU whose sequence number is higher than that of the PDCP PDU, is further indicated. Specifically, the first status report further includes fifth information, and the fifth information is used to indicate a receiving status of a PDCP PDU after the first lost PDCP PDU or a receiving status of a PDCP PDU after the first PDCP PDU that is not received by the second user equipment. In the foregoing example, the fifth information is used to indicate a receiving status of a PDCP PDU after the first lost PDCP PDU, namely, a PDCP PDU whose sequence number is 6. In some embodiments, "0" may be used to indicate that the second user equipment fails to receive a PDCP PDU, and "1" may be used to indicate that the second user equipment receives a PDCP PDU. Herein, the fifth information may be "001", where the first "0" indicates that the second user equipment fails to receive a PDCP PDU whose SN is 7, the second "0" indicates that the second user equipment fails to receive a PDCP PDU whose SN is 8, and the last "1" indicates that the second user equipment receives a PDCP PDU whose SN is 9.

4. In some embodiments, the first status report includes sixth information, and the sixth information is a sequence number of the first lost PDCP PDU in the at least one PDCP PDU forwarded by the first user equipment to the second user equipment. In the foregoing example, the first user equipment determines that SNs of PDCP PDUs received by the second user equipment are 0, 1, 2, 3, 4, 5, . . . , and 9, and SNs of lost PDCP PDUs are 6, 7, and 8 in a process of forwarding from the first user equipment to the second user equipment. Therefore, it is determined that "a sequence number of the first lost PDCP PDU in the at least one PDCP PDU forwarded by the first user equipment to the second user equipment" is 6.

Alternatively, the sixth information is a sequence number SN of the first PDCP PDU that is not received by the second user equipment in the at least one PDCP PDU forwarded by the first user equipment to the second user equipment. In the foregoing example, the first user equipment determines that SNs of PDCP PDUs received by the second user equipment are 0, 1, 2, 3, 4, 5, . . . , and 9, and SNs of PDCP PDUs of the second user equipment are 6, 7, and 8 in a process of forwarding from the first user equipment to the second user. Therefore, it is determined that "a sequence number of the first PDCP PDU that is not received by the second user equipment in the at least one PDCP PDU" is 6.

Further, after the first lost PDCP PDU in all PDCP PDUs received by the second user equipment is indicated by using the sixth information, a sequence number SN of a PDCP PDU that is successfully forwarded by the first user equipment and that has a highest PDCP SN or a highest PDCP count value in the at least one PDCP PDU and a quantity of lost PDCP PDUs is further indicated. Specifically, the first status report further includes seventh information and eighth information, where the seventh information is used to indicate a sequence number of a PDCP PDU that is successfully forwarded by the first user equipment and that has a highest PDCP SN or a highest PDCP count value in the at least one PDCP PDU, and the eighth information is used to indicate a quantity of lost PDCP PDUs.

In the foregoing example, "a sequence number of a PDCP PDU that is successfully forwarded by the first user equipment and that has a highest PDCP SN or a highest PDCP count value" is 9, and the quantity of lost PDCP PDUs is 3.

It should be noted that, in addition to the foregoing information, the first status report in the foregoing four implementations may include information indicating a buffer size of the first user equipment. The information about the buffer size may be a size of a total buffer allocated by the first user equipment to the second user equipment; or the information about the buffer size is a size of an available buffer at a reporting moment of the first status report in a total buffer allocated by the first user equipment to the second user equipment; or the information about the buffer size is a size of a buffer that is allocated by the first user equipment to the second user equipment to store data of each radio bearer of the second user equipment; or the information about the buffer size is a size of an available buffer at a reporting moment of the first status report in a buffer that is allocated by the first user equipment to the second user equipment to store data of each radio bearer of the second user equipment.

Figures 5, 6A:
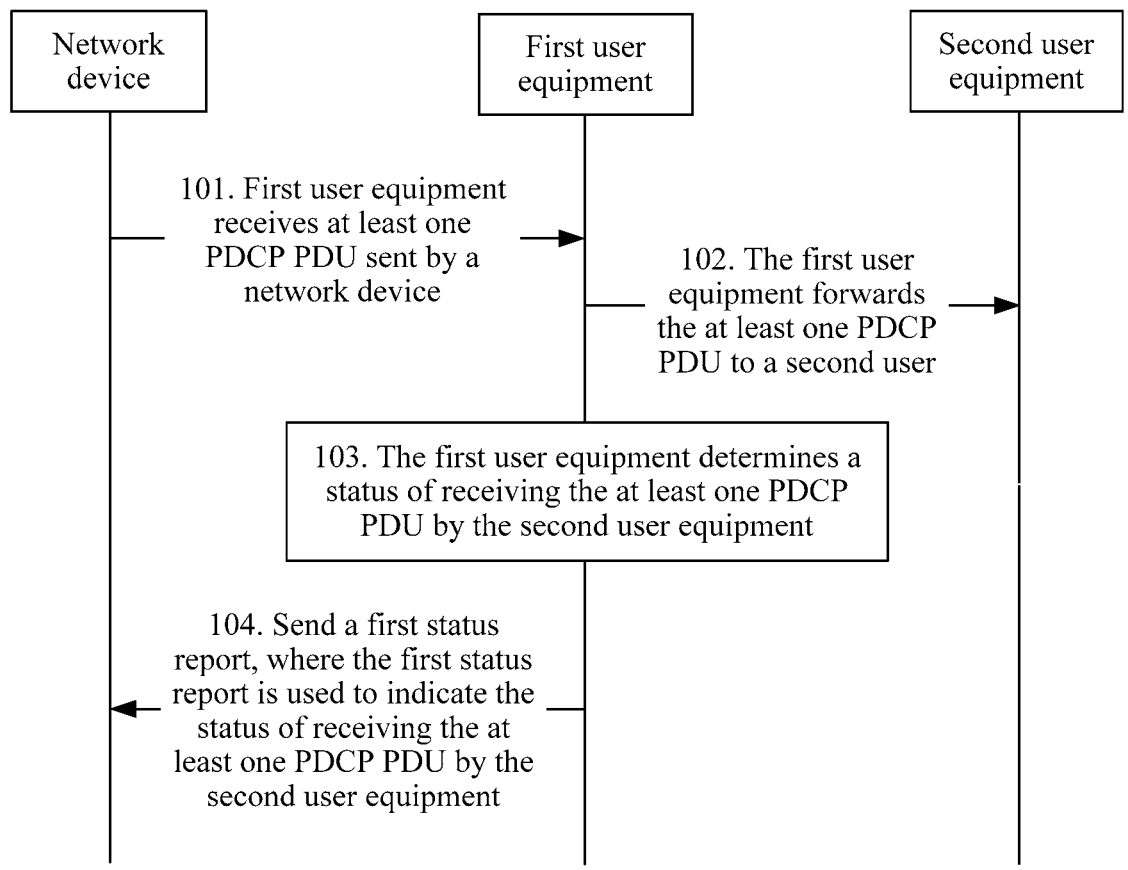
FIG. 5 is a schematic flowchart of a data receiving status reporting method according to an example embodiment.
FIG. 6a is a schematic diagram of a frame structure of a first status report according to an example embodiment.

An example embodiment provides a data receiving status reporting method. As shown in FIG. 5, the method includes the following steps.

101. First user equipment receives at least one PDCP PDU sent by a network device.

Referring to FIG. 1, there is a non-direct path between a base station and a second user, the second user equipment is connected to the first user equipment, and the second user equipment may receive, through relay by the first user equipment, downlink data sent by the base station. Therefore, the base station first sends, to the first user equipment by using a corresponding second radio bearer, at least one PDCP PDU that is from a first radio bearer and that is to be sent to the second user equipment. The first radio bearer is a radio bearer between the second user equipment and the network device. As shown in FIG. 3A and FIG. 3B, the first radio bearer includes a PDCP entity between the second user equipment and the network device. The second radio bearer is a radio bearer between the first user equipment and the network device. As shown in FIG. 3A and FIG. 3B, the second radio bearer includes an RLC (Uu) entity between the first user equipment and the network device and a corresponding logical channel.

102. The first user equipment forwards the at least one PDCP PDU to a second user.

In a specific example implementation, when the first user equipment is connected to the second user equipment by using a sidelink technology, the first user equipment may send the at least one PDCP PDU to the second user equipment by using a third radio bearer of a sidelink between the first user equipment and the second user equipment. The third radio bearer is a radio bearer between the first user equipment and the second user equipment. As shown in FIG. 3A and FIG. 3B, the third radio bearer includes an RLC (PC5) entity between the first user equipment and the second user equipment and a corresponding logical channel. Optionally, the third radio bearer further includes a PDCP (PC5) entity between the first user equipment and the second user equipment.

103. The first user equipment determines a status of receiving the at least one PDCP PDU by the second user equipment.

It should be noted that, limited to a network status of transmission between the first device and the second device, the second user equipment may fail to receive some PDCP PDUs in the at least one PDCP PDU. To avoid a packet loss, the second user equipment is to feed back the receiving status of the at least one PDCP PDU to the first user equipment, so that the first user equipment retransmits, based on the fed-back receiving status, a PDCP PDU that is not correctly received by the second user equipment.

104. The first user equipment sends a first status report to the network device, where the first status report is used to indicate the status of receiving the at least one PDCP PDU by the second user equipment.

Trigger of the first status report has the foregoing three possibilities, and details are not described herein again.

Implementation of the first status report has the foregoing three possibilities, and specific carried content is not further described herein. The following uses an example in which the first status report is carried on an adaptation layer PDU to describe content and a format included in the first status report.

A first example implementation of the first status report may have a format of the form shown in FIG. 6a. For example, a length of a PDCP SN is 7 bits. Another length of the PDCP SN may be correspondingly designed. Referring to FIG. 6a, a data/control (Date/Control, D/C) field is used to indicate whether a current adaptation layer PDU is a data PDU or a control PDU.

A PDU type (type) field is used to indicate a type of a control PDU if a current adaptation layer PDU is the control PDU. For example, 000 represents a type of a PDU. Other values (001 to 111) currently may be reserved values.

A UE local ID field is used to indicate a unique identifier of remote UE (the second user equipment in this example embodiment) connected to relay UE. In other words, the UE local ID field may be a unique identifier of the second user equipment connected to the first user equipment. For example, three user equipment are relayed by the first user equipment, where 00 represents user equipment A, 01 represents user equipment B, and 10 represents user equipment C (the second user equipment in this embodiment). In this case, the UE local ID field is padded with 10.

An RB ID field is used to indicate a DRB of remote UE to which a current status report is specific, namely, a radio bearer identifier of the third radio bearer.

An R field is used to indicate a reserved bit.

An HDS (highest successfully delivered in sequence PDCP SN) field is used to indicate an SN corresponding to a PDCP PDU that has a highest PDCP SN and that is in PDCP PDUs with consecutive SNs successfully transmitted by the relay UE (the first user equipment in this embodiment) to the remote UE by using the third radio bearer indicated by the RB ID field, namely, first information in this embodiment, for example, a sequence number SN of a PDCP PDU that is in PDCP PDUs successfully forwarded by the first user equipment consecutively and that has a highest PDCP SN or a highest PDCP count in the at least one PDCP PDU. Certainly, the HDS field may be alternatively used to indicate another sequence number SN in the foregoing first implementation, for example, a sequence number of a PDCP PDU that is in PDCP PDUs successfully received by the second user equipment consecutively and that has a highest PDCP SN or a highest PDCP count in the at least one PDCP PDU.

It should be noted that, as shown in FIG. 6b, the first status report shown in FIG. 6a may further include a buffer indication field buffersize, and the buffer indication field buffersize is used to indicate information about a buffer size of the first user equipment. The information about the buffer size may be a size of a total buffer allocated by the first user equipment to the second user equipment; or the information about the buffer size is a size of an available buffer at a reporting moment of the first status report in a total buffer allocated by the first user equipment to the second user equipment; or the information about the buffer size is a size of a buffer that is allocated by the first user equipment to the second user equipment to store data of each radio bearer of the second user equipment; or the information about the buffer size is a size of an available buffer at a reporting moment of the first status report in a buffer that is allocated by the first user equipment to the second user equipment to store data of each radio bearer of the second user equipment.

The buffer indication field of 4 bytes is used as an example in FIG. 6b. A different length may be designed, and this is not limited herein.

In the foregoing example, the base station forwards 10 PDCP PDUs whose SNs are sequentially 0 to 9 to the second user equipment by using the first user equipment. The first user equipment determines, based on a second status report fed back by the second user equipment, that the second user equipment receives PDCP PDUs whose SNs are 0 to 5 and a PDCP PDU whose SN is 9. In other words, the second user equipment fails to receive PDCP PDUs whose SNs are 6 to 8. A value of the HDS field may be 5 or 6.

In conclusion, the first status report defined in the first implementation may be implemented in the format shown in FIG. 6a or FIG. 6b.

In a second example implementation of the first status report, a format of the first status report may be a form shown in FIG. 7a. Referring to FIG. 7a, for functions of a D/C field, a PDU type field, a UE local ID field, an RB ID field, and an R field, refer to the foregoing descriptions of these indication fields in FIG. 6a. Details are not described herein again.

In addition, an ACK_SN field is used to indicate an SN corresponding to a PDCP PDU that has a highest PDCP SN or a highest PDCP count and that is in PDCP PDUs successfully transmitted by the relay UE to the remote UE by using the third radio bearer indicated by the RB ID field, namely, "second information" in the second implementation, for example, "a sequence number of a PDCP PDU that is successfully forwarded by the first user equipment and that has a highest PDCP SN or a highest PDCP count value in the at least one PDCP PDU" in this embodiment. Certainly, the ACK_SN field may be alternatively used to indicate another sequence number in the foregoing first implementation, for example, a sequence number of a PDCP PDU following a PDCP PDU that is in PDCP PDUs successively received by the second user equipment consecutively and that has a highest PDCP SN or a highest PDCP count in the at least one PDCP PDU.

A NACK_SN field is used to indicate an SN corresponding to a PDCP PDU that has not been successfully transmitted by the relay UE to the remote UE, namely, third information in this embodiment, and may be a PDCP sequence number of a lost PDCP PDU in the at least one PDCP PDU forwarded by the first user equipment to the second user equipment.

It should be noted that, as shown in FIG. 7b, the first status report shown in FIG. 7a may further include a buffer indication field buffersize, and the buffer indication field buffersize is used to indicate information about a buffer size of the first user equipment. The information about the buffer size may be a size of a total buffer allocated by the first user equipment to the second user equipment; or the information about the buffer size is a size of an available buffer at a reporting moment of the first status report in a total buffer allocated by the first user equipment to the second user equipment; or the information about the buffer size is a size of a buffer that is allocated by the first user equipment to the second user equipment to store data of each radio bearer of the second user equipment; or the information about the buffer size is a size of an available buffer at a reporting moment of the first status report in a buffer that is allocated by the first user equipment to the second user equipment to store data of each radio bearer of the second user equipment.

In addition, the buffer indication field of 4 bytes is used as an example in FIG. 7b. Another length may be designed, and this is not limited herein.

It should be noted that a quantity of lost PDCP PDUs in the at least one PDCP PDU is equal to a quantity of NACK_SN fields, and each NACK_SN field is filled with an SN of a lost PDCP PDU. In the foregoing example, the base station forwards 10 PDCP PDUs whose SNs are sequentially 0 to 9 to the second user equipment by using the first user equipment. The first user equipment determines, based on a second status report fed back by the second user equipment, that the second user equipment receives PDCP PDUs whose SNs are 0 to 5 and a PDCP PDU whose SN is 9. In other words, the second user equipment fails to receive PDCP PDUs whose SNs are 6 to 8. A value of the ACK_SN field is 9, and values of the NACK_SN fields are sequentially 6, 7, and 8.

In conclusion, the first status report defined in the second implementation may be implemented in the format shown in FIG. 7a or FIG. 7b.

In a third example implementation of the first status report, a format of the first status report may be a form shown in FIG. 8a. Referring to FIG. 8a, for functions of a D/C field, a PDU type field, a UE local ID field, an RB ID field, and an R field, refer to the foregoing descriptions of these indication fields in FIG. 6a. Details are not described herein again.

In addition, an FUDS (First undelivered PDCP SN) field is used to indicate a sequence number SN corresponding to the first PDCP PDU that has not been successfully transmitted by the relay UE to the remote UE by using the third radio bearer indicated by the RB ID field, namely, fourth information in this embodiment, for example, "a sequence number of the first lost PDCP PDU in the at least one PDCP PDU forwarded by the first user equipment to the second user equipment".

A bitmap field is used to indicate a receiving status of a PDCP PDU after a PDCP PDU indicated by the FUDS field. Specifically, the bitmap field is used to indicate a PDCP PDU after a PDCP PDU indicated by one FUDS field corresponding to each bit in the bitmap field, and is used to indicate whether a PDCP PDU corresponding to the bit has been successfully sent to the remote UE. For example, in this example embodiment, "1" indicates that the second user equipment receives a corresponding PDCP PDU forwarded by the first user equipment, and "0" indicates that the second user equipment fails to receive a corresponding PDCP PDU forwarded by the first user equipment.

It should be noted that, a quantity of bits in the bitmap field in the first status report shown in FIG. 8 is equal to a quantity of PDCP sequence numbers between the last PDCP PDU successfully received by the second user equipment and a PDCP PDU following the first lost PDCP PDU in PDCP PDUs that are forwarded by the first user equipment to the second user equipment by using the third radio bearer indicated by the RB ID field. In addition, each bit is filled with a value indicating a receiving status of one PDCP PDU, for example, "0" or "1". In the foregoing example, the base station is to forward 10 PDCP PDUs whose SNs are sequentially 0 to 9 to the second user equipment by using the first user equipment. The first user equipment determines, based on a second status report fed back by the second user equipment, that the second user equipment receives PDCP PDUs whose SNs are 0 to 5 and a PDCP PDU whose SN is 9. In other words, the second user equipment fails to receive PDCP PDUs whose SNs are 6 to 8. A value of the FUDS field is 6, and values of bitmap fields are sequentially 0, 0, and 1.

It should be noted that, as shown in FIG. 8b, the first status report shown in FIG. 8a may further include a buffer indication field buffersize, and the buffer indication field buffersize is used to indicate information about a buffer size of the first user equipment. The information about the buffer size may be a size of a total buffer allocated by the first user equipment to the second user equipment; or the information about the buffer size is a size of an available buffer at a reporting moment of the first status report in a total buffer allocated by the first user equipment to the second user equipment; or the information about the buffer size is a size of a buffer that is allocated by the first user equipment to the second user equipment to store data of each radio bearer of the second user equipment; or the information about the buffer size is a size of an available buffer at a reporting moment of the first status report in a buffer that is allocated by the first user equipment to the second user equipment to store data of each radio bearer of the second user equipment.

In addition, the buffer indication field of 4 bytes is used as an example in FIG. 8b. Another length may be designed, and this is not limited herein.

In conclusion, the first status report defined in the third example implementation may be implemented in the format shown in FIG. 8a or FIG. 8b.

It should be noted that in this embodiment, a PDCP PDU after a PDCP PDU is a PDCP PDU whose PDCP sequence number SN or PDCP count value is higher than that of the PDCP PDU. In addition, a PDCP PDU before the PDCP PDU is a PDCP PDU whose PDCP sequence number or PDCP count value is lower than that of the PDCP PDU.

Figure 9:
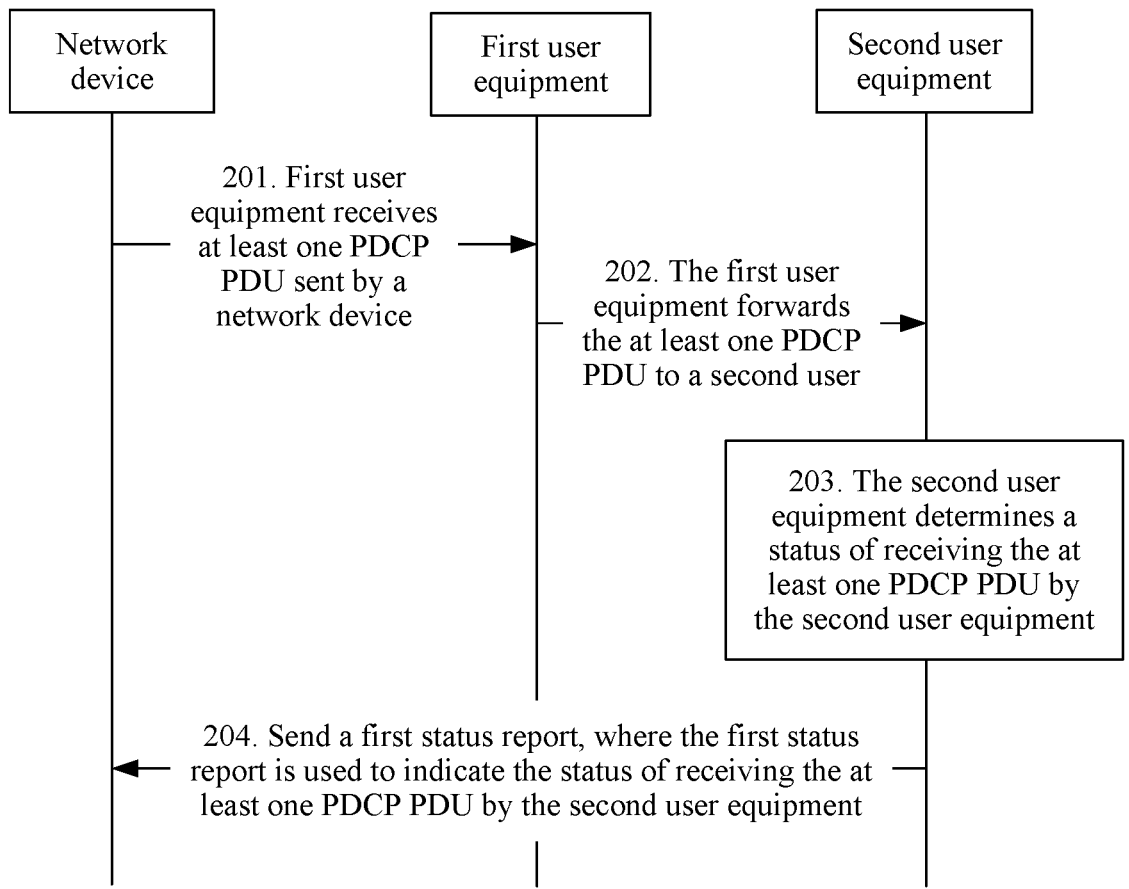
FIG. 9 is a schematic flowchart of another data receiving status reporting method according to an example embodiment.

An example embodiment further provides a data receiving status reporting method. As shown in FIG. 9, the method includes the following steps.

201. First user equipment receives at least one PDCP PDU sent by a network device.

Referring to FIG. 1, there is a non-direct path between a base station and a second user, the second user equipment is connected to the first user equipment, and the second user equipment may receive, through relay by the first user equipment, downlink data sent by the base station. Therefore, the base station first sends, to the first user equipment by using a corresponding second radio bearer, at least one PDCP PDU that is from a first radio bearer and that is to be sent to the second user equipment. The first radio bearer is a radio bearer between the second user equipment and the network device. As shown in FIG. 3A and FIG. 3B, the first radio bearer includes a PDCP entity between the second user equipment and the network device. The second radio bearer is a radio bearer between the first user equipment and the network device. As shown in FIG. 3A and FIG. 3B, the second radio bearer includes an RLC (Uu) entity between the first user equipment and the network device and a corresponding logical channel.

202. The first user equipment forwards the at least one PDCP PDU to a second user.

In a specific example implementation, when the first user equipment is connected to the second user equipment by using a sidelink technology, the first user equipment may send the at least one PDCP PDU to the second user equipment by using a third radio bearer of a sidelink between the first user equipment and the second user equipment. The third radio bearer is a radio bearer between the first user equipment and the second user equipment. As shown in FIG. 3A and FIG. 3B, the third radio bearer includes an RLC (PC5) entity between the first user equipment and the second user equipment and a corresponding logical channel. Optionally, the third radio bearer further includes a PDCP (PC5) entity between the first user equipment and the second user equipment.

203. The second user equipment determines a receiving status of the at least one PDCP PDU.

In a specific example implementation, an RLC entity of the first user equipment performs segmentation and/or concatenation on the at least one PDCP PDU to obtain an RLC PDU, and then forwards the RLC PDU to the second user equipment. Alternatively, an RLC layer of the second user equipment may perform segmentation and/or concatenation on a received RLC PDU to obtain a PDCP PDU, and then deliver the obtained PDCP PDU to a PDCP layer of the second user equipment. Therefore, the PDCP layer of the second user equipment may determine which PDCP PDU in the at least one PDCP PDU is received by the second user equipment, and which PDCP PDU is not received by the second user equipment.

For example, the RLC entity of the first user equipment receives PDCP PDUs whose SNs are 0, 1, and 2 and that are transmitted by a PDCP entity of the first user equipment, and may perform concatenation on the three PDCP PDUs to obtain two RLC PDUs whose numbers are 0 and 1. If receiving statuses of the two RLC PDUs whose numbers are 0 and 1 in an RLC status report fed back by the second user equipment are ACK, the two RLC PDUs are successfully received by the second user equipment, and the first user equipment may determine that all the three PDCP PDUs whose SNs are 0, 1, and 2 are successfully received by the second user equipment.

204. The second user equipment sends a status report to the network device, where the status report is used to indicate the status of receiving the at least one PDCP PDU by the second user equipment.

It should be noted that implementations of the status report reported by the second user equipment may be the same as the foregoing four implementations of the first status report.

When the second user equipment determines the status report in the foregoing first implementation, a PDCP entity of the second user equipment determines first information in the first status report based on a currently received PDCP SDU (which may be considered as a PDCP PDU in this embodiment).

In some embodiments, a trigger condition of the status report is: when an RLC entity of the second user equipment triggers the RLC status report, the RLC entity of the second user equipment instructs the PDCP entity to trigger the status report. For example, referring to FIG. 3A and FIG. 3B, when a PC5 RLC entity of remote UE triggers sending of the RLC status report, the PC5 RLC entity instructs a PDCP entity (a PDCP (Uu) shown in FIG. 3A and FIG. 3B) to trigger the status report.

Alternatively, the base station configures a sending period of the status report for the remote UE (the second user equipment in this embodiment). The remote UE starts a timer, and when the periodic timer expires, a PDCP entity of the remote UE triggers the status report. For the timer, the second user equipment may maintain a common timer for all third radio bearers. When the timer expires, the second user equipment triggers and generates PDCP status reports of all the third radio bearers. Alternatively, the second user equipment maintains one timer for each third radio bearer. When the timer expires, the second user equipment triggers and generates a PDCP status report of a corresponding third radio bearer.

Alternatively, when the PDCP entity of the remote UE receives a PDCP PDU sent by the base station, and an indicator bit (Poll bit) included in the PDCP PDU instructs the remote UE to trigger the PDCP status report, the PDCP entity triggers the status report. For example, when a value of the indicator bit (Poll bit) included in the PDCP PDU is 1 "0", the PDCP entity of the remote UE does not trigger the status report; or when the PDCP PDU includes "1", the PDCP entity of the remote UE triggers the status report.

When the second user equipment determines the status report in the foregoing second, fourth, or fourth implementation of the first status report, the second user equipment may determine the status report by using the following two methods.

1. After the PDCP entity of the second user equipment triggers the status report, the PDCP entity queries the RLC entity of the second user equipment about a receiving status of a PDCP PDU. After receiving the query indication, the RLC entity performs segmentation and/or concatenation on RLC PDUs that are received out of order, and determines a sequence number SN of a PDCP PDU corresponding to an RLC SDU that is obtained through segmentation and/or concatenation.

Specifically, for example, when the PDCP triggers the status report, and queries the RLC entity about the receiving status of the PDCP PDU, RLC numbers of RLC PDUs currently received by the RLC are 6, 7, and 8. Before this, the RLC has received RLC PDUs whose RLC numbers are 1, 2, and 3, and delivered the RLC PDUs to the PDCP entity. Because RLC PDUs whose RLC numbers are 4, 5, and 6 are not received, the RLC entity does not deliver the RLC PDUs whose RLC numbers are 6, 7, and 8 to the PDCP entity. After receiving the query indication from the PDCP, the RLC layer performs segmentation and/or concatenation on the RLC PDUs whose numbers are 6, 7, and 8. For example, two RLC SDUs are obtained after the segmentation and/or concatenation, and numbers of PDCP PDUs respectively corresponding to the two RLC SDUs are 4 and 5. In this case, the RLC notifies the PDCP layer that PDCP PDUs whose PDCP SNs are 4 and 5 have been successfully received, so that the PDCP layer determines content of the PDCP status report.

2. When the remote UE is connected to the base station in a non-direct mode, a reordering function is no longer performed by an RLC entity of the remote UE, but is performed by a PDCP entity. In this way, the PDCP entity can obtain, in a timely manner, an SN of a PDCP PDU that has been successfully received.

It should be noted that in this example the status report determined by the PDCP of the second user equipment includes the first information.

The first information is used to indicate a sequence number SN of a PDCP SDU that is in PDCP SDUs successfully forwarded by the first user equipment consecutively and that has a highest PDCP sequence number SN or a highest PDCP count value in the at least one PDCP SDU; or the first information is used to indicate a sequence number of the last PDCP SDU that is in PDCP SDUs successfully forwarded by the first user equipment consecutively in the at least one PDCP SDU; or the first information is used to indicate a sequence number SN of a PDCP SDU following a PDCP SDU that is in PDCP SDUs successfully forwarded by the first user equipment consecutively and that has a highest PDCP SN or a highest PDCP count value in the at least one PDCP SDU; or the first information is used to indicate a sequence number SN of a PDCP SDU following the last PDCP SDU that is in PDCP SDUs successfully forwarded by the first user equipment consecutively in the at least one PDCP SDU; or the first information is used to indicate a sequence number SN of a PDCP SDU that is in PDCP SDUs successfully received by the second user equipment consecutively and that has a highest PDCP SN or a highest PDCP count value in the at least one PDCP SDU; or the first information indicates a sequence number SN of the last PDCP SDU that is in PDCP SDUs successfully received by the second user equipment consecutively in the at least one PDCP SDU; or the first information is used to indicate a sequence number SN of a PDCP SDU following a PDCP SDU that is in PDCP SDUs successfully received by the second user equipment consecutively and that has a highest PDCP SN or a highest PDCP count value in the at least one PDCP SDU; or the first information is used to indicate a sequence number SN of a PDCP SDU following the last PDCP SDU that is in PDCP SDUs successfully received by the second user equipment consecutively.

In some embodiments, the status report includes second information, and the second information is used to indicate a sequence number SN of a PDCP SDU that is successfully forwarded by the first user equipment and that has a highest PDCP SN or a highest PDCP count value in the at least one PDCP SDU; or the second information is used to indicate a sequence number SN of a PDCP SDU following a PDCP SDU that is successfully forwarded by the first user equipment and that has a highest PDCP SN or a highest PDCP count value in the at least one PDCP SDU; or the second information is used to indicate a sequence number SN of a PDCP SDU that is successfully received by the second user equipment and that has a highest PDCP SN or a highest PDCP count value in the at least one PDCP SDU; or the second information is a sequence number SN of a PDCP SDU following a PDCP SDU that is successfully received by the second user equipment and that has a highest PDCP SN or a highest PDCP count value in the at least one PDCP SDU.

If the status report includes the second information, the status report further includes third information. The third information is a PDCP sequence number SN of a lost PDCP SDU in the at least one PDCP SDU forwarded by the first user equipment to the second user equipment.

In some embodiments, the status report includes fourth information. The fourth information is a sequence number SN of the first lost PDCP SDU in the at least one PDCP SDU forwarded by the first user equipment to the second user equipment; or the fourth information is a sequence number SN of the first PDCP SDU that is not received by the second user equipment and that is in the at least one PDCP SDU forwarded by the first user equipment to the second user equipment.

Further, the status report further includes fifth information, and the fifth information is used to indicate a receiving status of a PDCP SDU after the first lost PDCP SDU or a receiving status of a PDCP SDU after the first PDCP SDU that is not received by the second user equipment.

In addition, the status report is generated by the PDCP of the second user equipment.

According to the data receiving status reporting method provided in this embodiment, when there is a non-direct path between the remote UE and the base station, the base station sends at least one data packet to the remote UE by using relay UE, and the relay UE determines a status of receiving the at least one data packet by the remote UE, and reports, to the base station, the status of receiving the at least one data packet by the remote UE. When there is a direct path between the remote UE and the base station, the base station may retransmit, to the remote UE based on the status of receiving the at least one data packet by the remote UE, a data packet that is in the at least one data packet and that is not successfully received by the remote UE. In a prior art approach, a status report fed back by the relay UE to the base station can reflect only a status of receiving the at least one data packet by the relay UE. If a packet loss occurs on a transmission path between the relay UE and the remote UE, the status report cannot reflect a real status of receiving the at least one data packet by the remote UE. However, in this example embodiment, the status report that is fed back by the relay UE and that is received by the base station may truly reflect the status of receiving the at least one data packet by the remote UE, so that the base station retransmits a data packet to the remote UE based on the status report, and the remote UE receives, before receiving a lost data packet in the at least one data packet, a data packet after the at least one data packet transmitted by the base station. In this way, out-of-order receiving by the remote UE is avoided.

The foregoing mainly describes the solutions provided in the example embodiments from the perspective of interaction between network elements. It can be understood that, to implement the foregoing functions, the apparatus in the example embodiments includes a corresponding hardware structure and/or software module for executing each function. A person skilled in the art will understand that, in combination with units and algorithm steps of the examples described in the embodiments disclosed in this specification, the embodiments herein may be implemented by using hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In the embodiments of this application, the apparatus may be divided into function modules based on the foregoing method examples. For example, each function module may be obtained through division based on each corresponding function, or two or more functions may be integrated into one processing module or component. The integrated module may be implemented in a form of hardware, or may be implemented in a form of a software function module. It should be noted that module division in the embodiments of this application is an example and is merely logical function division. During implementation, there may be another division manner.

Figure 10:
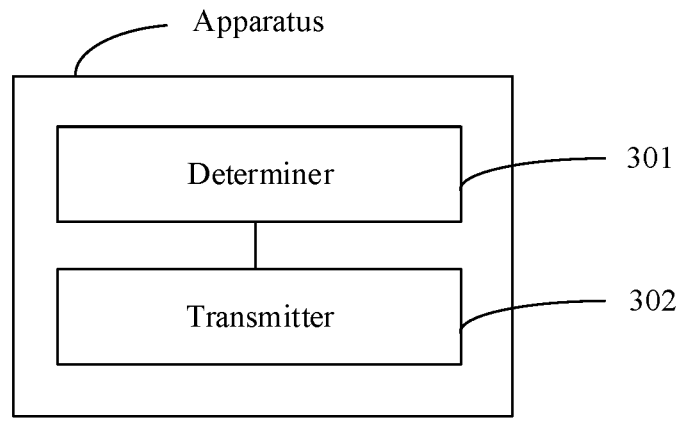
FIG. 10 is another schematic structural diagram of an apparatus according to an example embodiment.

When each function module is obtained through division based on each corresponding function, FIG. 10 is a possible schematic composition diagram of the apparatus (disposed in the first user equipment) in the foregoing embodiment. As shown in FIG. 10, the apparatus may include a determiner 301 and a transmitter 302.

The determiner 301 is configured to support the apparatus in performing step 103 in the data receiving status reporting method shown in FIG. 5.

The transmitter 302 is configured to support the apparatus in performing step 104 in the data receiving status reporting method shown in FIG. 5.

It should be noted that all related content of the steps in the method embodiments may be cited in function descriptions of the corresponding function modules, and details are not described herein again.

The apparatus provided in this embodiment is configured to perform the foregoing data receiving status reporting method, and therefore an effect the same as that of the foregoing data receiving status reporting method can be achieved.

Figure 11:
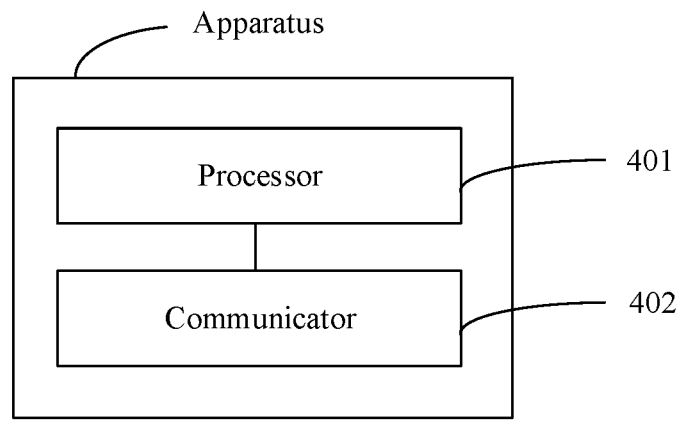
FIG. 11 is another schematic structural diagram of an apparatus according to an example embodiment.

When an integrated unit is used, FIG. 11 is another possible schematic composition diagram of the apparatus in the foregoing embodiment. As shown in FIG. 11, the apparatus includes a processor 401 and a communicator 402.

The processor 401 is configured to control and manage an action of a server. For example, the processor 301 is configured to support the apparatus in performing step 103 in FIG. 6 and/or another process of the technology described in this specification. The communicator 402 is configured to support the apparatus in communicating with another network entity, for example, communicating with the remote UE (remote UE, namely, the second user equipment in the embodiments) or the base station shown in FIG. 1. The apparatus may further include a storage 403, configured to store program code and data of the server.

The processor 401 may be a processor or a controller. The processor 401 may implement or execute various example logical blocks, modules, and circuits described with reference to content disclosed herein. The processor may be alternatively a combination that implements a calculation function, for example, including one microprocessor or a combination of a plurality of microprocessors, or a combination of a DSP and a microprocessor. The communicator 402 may be a transceiver, a transceiver circuit, a communications interface, or the like. The storage 403 may be a memory.

When the processor 401 is a processor, the communicator 402 is a communications interface. When the storage 403 is a memory, the apparatus in this embodiment of this application may be the apparatus shown in FIG. 4.

Figure 12:
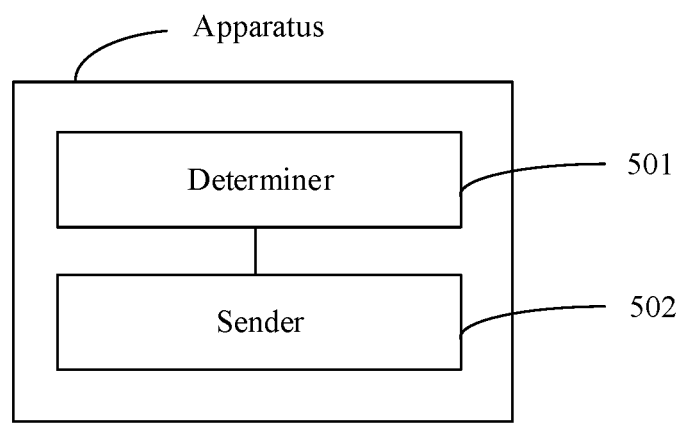
FIG. 12 is another schematic structural diagram of an apparatus according to an example embodiment.

When each function module is obtained through division based on each corresponding function, FIG. 12 is a possible schematic composition diagram of the apparatus of the second user equipment in the foregoing embodiment. As shown in FIG. 12, the apparatus may include a determiner 501 and a sender 502.

The determiner 501 is configured to support the apparatus in performing step 203 in the data receiving status reporting method shown in FIG. 9.

The sender 502 is configured to support the apparatus in performing step 204 in the data receiving status reporting method shown in FIG. 9.

It should be noted that all related content of the steps in the method embodiments may be cited in function descriptions of the corresponding function modules, and details are not described herein again.

The apparatus provided in this embodiment is configured to perform the foregoing data receiving status reporting method, and therefore an effect the same as that of the foregoing data receiving status reporting method can be achieved.

Figure 13:
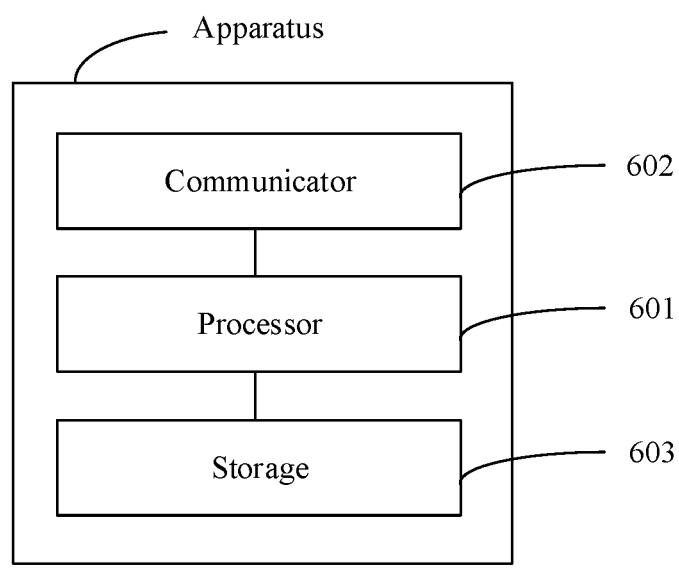
FIG. 13 is another schematic structural diagram of an apparatus according to an example embodiment.

When an integrated unit is used, FIG. 13 is another possible schematic composition diagram of the apparatus disposed in the second user equipment in the foregoing embodiment. As shown in FIG. 13, the apparatus includes a processor 601 and a communicator 602.

The processor 601 is configured to control and manage an action of the apparatus. The communicator 602 is configured to support the apparatus in communicating with another network entity, for example, communicating with the base station or the relay UE shown in FIG. 1. The apparatus may further include a storage 603, configured to store program code and data of the apparatus.

The processor 601 may be a processor or a controller. The processor 601 may implement or execute various example logical blocks, modules, and circuits described with reference to content disclosed in this application. The processor 601 may be alternatively comprise a combination that implements a calculation function, for example, including one microprocessor or a combination of a plurality of microprocessors, or a combination of a DSP and a microprocessor. The communicator 602 may be a transceiver, a transceiver circuit, a communications interface, or the like. The storage 603 may be a memory.

Figure 14:
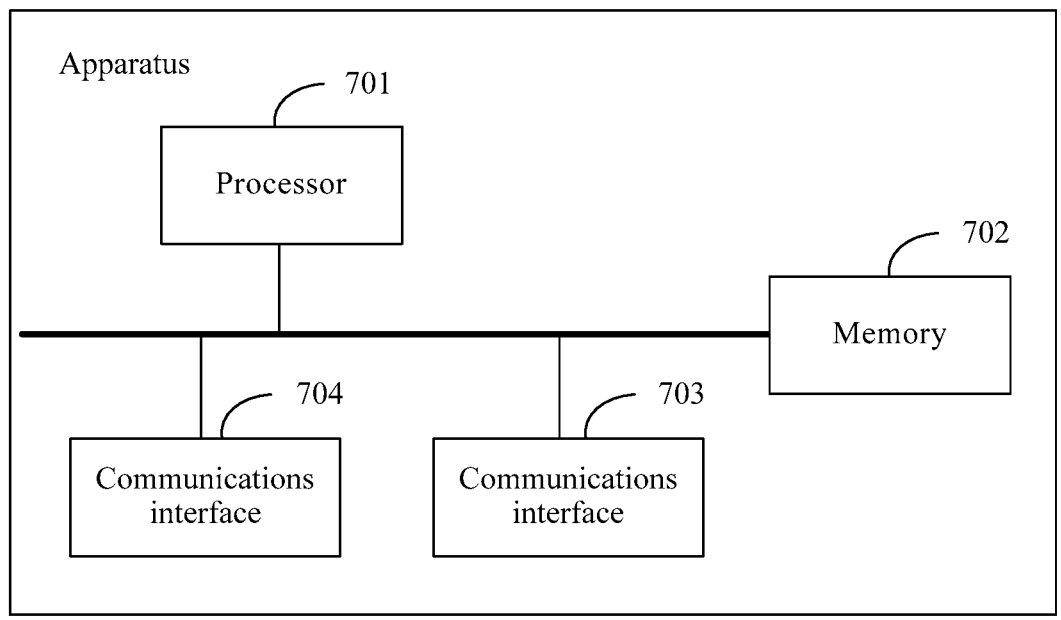
FIG. 14 is another schematic structural diagram of an apparatus according to an example embodiment.

When the processor 601 is a processor, the communicator 602 is a transceiver, and the storage 603 is a memory, the apparatus in this embodiment of this application may be an apparatus shown in FIG. 14. As shown in FIG. 14, the apparatus includes a processor 701, a memory 702, a communications interface 703, and a communications interface 704. The communications interface 703 is configured to communicate with first user equipment (for example, the relay user equipment in the communications system shown in FIG. 1), and the communications interface 704 is configured to communicate with a network device (for example, the base station in the communications system shown in FIG. 1).

The foregoing descriptions about implementations allow a person skilled in the art to understand that, for the purpose of convenient and brief description, division of the foregoing function modules is used as an example for illustration. In actual application, the foregoing functions can be allocated to different modules and implemented according to an implementation constraint, that is, an inner structure of an apparatus is divided into different function modules to implement all or some of the functions described above. For a detailed working process of the foregoing system, apparatus, and unit, refer to a corresponding process in the foregoing method embodiments. Further details are not described herein.

In the several embodiments provided herein, it should be understood that the disclosed system, apparatus, and method may be implemented in other ways. For example, the described apparatus embodiment is only an example. For example, the module or unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a non-transitory computer-readable storage medium. Based on such an understanding, all or some of the technical solutions herein may be implemented in the form of a software product. The computer software product is stored in a non-transitory storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a flash memory, a removable hard disk, a read-only memory, a random access memory, a magnetic disk, or a compact disc.

The foregoing descriptions are merely specific example embodiments of this application, but are not intended to limit the protection scope of this patent. Any variation or replacement within the technical scope disclosed herein shall fall within the protection scope of this patent. Therefore, the protection scope of this patent shall be defined by the claims.

What is claimed is:

1. A data receiving status reporting method, comprising:
   determining, by first user equipment, a status of receiving at least one packet data convergence protocol layer protocol data unit PDCP PDU by second user equipment, wherein the at least one PDCP PDU is forwarded by the first user equipment to the second user equipment after being received by the first user equipment through a communications link between the first user equipment and a network device; and
   sending, by the first user equipment, a first status report to the network device, wherein the first status report is used to indicate the status of receiving the at least one PDCP PDU by the second user equipment, the first status report reporting a sequence number that has a highest PDCP SN or a highest PDCP count value in the at least one PDCP PDU.

2. The method according to claim 1, wherein the first status report comprises first information; and
   the first information indicates:
   a sequence number of a PDCP PDU that is in PDCP PDUs successfully forwarded by the first user equipment consecutively and that has a highest PDCP sequence number SN or a highest PDCP count value in the at least one PDCP PDU; or
   a sequence number of the last PDCP PDU that is in PDCP PDUs successfully forwarded by the first user equipment consecutively in the at least one PDCP PDU; or
   a sequence number of a PDCP PDU following a PDCP PDU that is in PDCP PDUs successfully forwarded by the first user equipment consecutively and that has a highest PDCP SN or a highest PDCP count value in the at least one PDCP PDU; or
   a sequence number of a PDCP PDU following the last PDCP PDU that is in PDCP PDUs successfully forwarded by the first user equipment consecutively in the at least one PDCP PDU; or
   a sequence number of a PDCP PDU that is in PDCP PDUs successfully received by the second user equipment consecutively and that has a highest PDCP SN or a highest PDCP count value in the at least one PDCP PDU; or
   a sequence number of the last PDCP PDU that is in PDCP PDUs successfully received by the second user equipment consecutively in the at least one PDCP PDU; or
   the first information is used to indicates a sequence number of a PDCP PDU following a PDCP PDU that is in PDCP PDUs successfully received by the second user equipment consecutively and that has a highest PDCP SN or a highest PDCP count value in the at least one PDCP PDU; or
   a sequence number of a PDCP PDU following the last PDCP PDU that is in PDCP PDUs successfully received by the second user equipment consecutively.

3. The method according to claim 1, wherein the first status report comprises second information; and
   the second information indicates:
   a sequence number of a PDCP PDU that is successfully forwarded by the first user equipment and that has a highest PDCP SN or a highest PDCP count value in the at least one PDCP PDU; or
   a sequence number of a PDCP PDU following a PDCP PDU that is successfully forwarded by the first user equipment and that has a highest PDCP SN or a highest PDCP count value in the at least one PDCP PDU; or
   a sequence number of a PDCP PDU that is successfully received by the second user equipment and that has a highest PDCP SN or a highest PDCP count value in the at least one PDCP PDU; or
   a sequence number of a PDCP PDU following a PDCP PDU that is successfully received by the second user equipment and that has a highest PDCP SN or a highest PDCP count value in the at least one PDCP PDU.

4. The method according to claim 3, wherein the first status report further comprises third information, and the third information comprises a PDCP sequence number of a lost PDCP PDU in the at least one PDCP PDU forwarded by the first user equipment to the second user equipment.

5. The method according to claim 1, wherein the first status report comprises fourth information, and the fourth information comprises a sequence number of the first lost PDCP PDU in the at least one PDCP PDU forwarded by the first user equipment to the second user equipment; or the fourth information comprises a sequence number of the first PDCP PDU that is not received by the second user equipment in the at least one PDCP PDU forwarded by the first user equipment to the second user equipment.

6. The method according to claim 5, wherein the first status report further comprises fifth information, and the fifth information indicates a receiving status of a PDCP PDU after the first lost PDCP PDU or a receiving status of a PDCP PDU after the first PDCP PDU that is not received by the second user equipment.

7. The method according to claim 1, wherein the first status report further comprises at least one of sixth information and seventh information;

the sixth information comprises a user equipment identifier of the second user equipment; and the seventh information comprises a radio bearer identifier of the second user equipment.

8. The method according to claim 1, wherein the first status report is generated by one or more of a radio link control RLC protocol layer, a PDCP layer, and an adaptation layer between the PDCP layer and the RLC layer of the first user equipment.

9. The method according to claim 1, wherein before the sending, by the first user equipment, a first status report to the network device, the method further comprises:

receiving, by the first user equipment, a second status report sent by the second user equipment, wherein the second status report comprises a radio link control layer status report, and the second status report is used to indicate a status of receiving an RLC PDU by the second user equipment.

10. The method according to claim 9, wherein the determining, by first user equipment, a status of receiving at least one PDCP PDU by second user equipment comprises:

determining, by the first user equipment based on the second status report, the status of receiving the at least one PDCP PDU by the second user equipment.

11. An apparatus, disposed in user equipment, wherein the user equipment is first user equipment, and the apparatus comprises:

a processor, configured to determine a status of receiving at least one packet data convergence protocol layer protocol data unit PDCP PDU by second user equipment, wherein the at least one PDCP PDU is forwarded by the first user equipment to the second user equipment by using a transmitter after being received by the first user equipment through a communications link between the first user equipment and a network device; and the transmitter is configured to send a first status report to the network device, wherein the first status report indicates the status of receiving the at least one PDCP PDU by the second user equipment, the first status report reporting a sequence number that has a highest PDCP SN or a highest PDCP count value in the at least one PDCP PDU.

12. The apparatus according to claim 11, wherein the first status report comprises first information; and the first information indicates a sequence number of a PDCP PDU that is in PDCP PDUs successfully forwarded by the transmitter consecutively and that has a highest PDCP sequence number SN or a highest PDCP count value in the at least one PDCP PDU; or the first information indicates a sequence number of the last PDCP PDU that is in PDCP PDUs successfully forwarded by the transmitter consecutively in the at least one PDCP PDU; or the first information indicates a sequence number of a PDCP PDU following a PDCP PDU that is in PDCP PDUs successfully forwarded by the transmitter consecutively and that has a highest PDCP SN or a highest PDCP count value in the at least one PDCP PDU; or the first information indicates a sequence number of a PDCP PDU following the last PDCP PDU that is in PDCP PDUs successfully forwarded by the transmitter consecutively in the at least one PDCP PDU; or the first information indicates a sequence number of a PDCP PDU that is in PDCP PDUs successfully received by the second user equipment consecutively and that has a highest PDCP SN or a highest PDCP count value in the at least one PDCP PDU; or the first information indicates a sequence number of the last PDCP PDU that is in PDCP PDUs successfully received by the second user equipment consecutively in the at least one PDCP PDU; or the first information indicates a sequence number of a PDCP PDU following a PDCP PDU that is in PDCP PDUs successfully received by the second user equipment consecutively and that has a highest PDCP SN or a highest PDCP count value in the at least one PDCP PDU; or the first information indicates a sequence number of a PDCP PDU following the last PDCP PDU that is in PDCP PDUs successfully received by the second user equipment consecutively.

13. The apparatus according to claim 11, wherein the first status report comprises second information; and the second information indicates a sequence number of a PDCP PDU that is successfully forwarded by the transmitter and that has a highest PDCP SN or a highest PDCP count value in the at least one PDCP PDU; or the second information indicates a sequence number of a PDCP PDU following a PDCP PDU that is successfully forwarded by the transmitter and that has a highest PDCP SN or a highest PDCP count value in the at least one PDCP PDU; or the second information indicates a sequence number of a PDCP PDU that is successfully received by the second user equipment and that has a highest PDCP SN or a highest PDCP count value in the at least one PDCP PDU; or the second information comprises a sequence number of a PDCP PDU following a PDCP PDU that is successfully received by the second user equipment and that has a highest PDCP SN or a highest PDCP count value in the at least one PDCP PDU.

14. The apparatus according to claim 13, wherein the first status report further comprises third information, and the third information comprises a PDCP sequence number of a lost PDCP PDU in the at least one PDCP PDU forwarded by the transmitter to the second user equipment.

15. The apparatus according to claim 11, wherein the first status report comprises fourth information, and the fourth information comprises a sequence number of the first lost PDCP PDU in the at least one PDCP PDU forwarded by the transmitter to the second user equipment; or the fourth information comprises a sequence number of the first PDCP PDU that is not received by the second user equipment in the at least one PDCP PDU forwarded by the transmitter to the second user equipment.

16. The apparatus according to claim 15, wherein the first status report further comprises fifth information, and the fifth information indicates a receiving status of a PDCP PDU after the first lost PDCP PDU or a receiving status of a PDCP PDU after the first PDCP PDU that is not received by the second user equipment.

17. The apparatus according to claim 11, wherein the first status report further comprises at least one of sixth information and seventh information;

the sixth information comprises a user equipment identifier of the second user equipment; and the seventh information comprises a radio bearer identifier of the second user equipment.

18. The apparatus claim 11, further including one or more of a radio link control RLC protocol layer, a PDCP layer, and an adaptation layer between the PDCP layer and the RLC layer, and wherein the first status report is generated by the one or more of the radio link control RLC protocol layer, the PDCP layer, and the adaptation layer between the PDCP layer and the RLC layer.

19. The apparatus according to claim 11, wherein the apparatus further comprises a receiver, and the receiver is configured to: before the transmitter sends the first status report to the network device, receive a second status report sent by the second user equipment, wherein the second status report comprises a radio link control layer status report, and the second status report indicates a status of receiving an RLC PDU by the second user equipment.

20. A data receiving status reporting method, comprising:

determining, by second user equipment, a status of receiving at least one packet data convergence protocol layer protocol data unit PDCP SDU by the second user equipment, wherein the at least one PDCP SDU is forwarded by first user equipment to the second user equipment after being received by the first user equipment through a communications link between the first user equipment and a network device; and sending, by the second user equipment, a status report to the network device, wherein the status report is used to indicate the status of receiving the at least one PDCP SDU by the second user equipment, the status report reporting a sequence number that has a highest PDCP SN or a highest PDCP count value in the at least one PDCP PDU.

21. A non-transitory computer readable storage medium storing instructions for use in a system wherein at least one packet data convergence protocol layer protocol data unit is forwarded by first user equipment to second user equipment after being received by the first user equipment through a communications link between the first user equipment and a network device, the instructions comprising:

first instructions that, when executed by a processor of the second user equipment, control the processor to determine a status of receiving the at least one packet data convergence protocol layer protocol data unit by the second user equipment; and second instructions that, when executed by the processor, control the processor to generate and send a status report to the network device, the status report indicating the status of receiving the at least one packet data convergence protocol layer protocol data unit by the second user equipment, the status report reporting a sequence number that has a highest PDCP SN or a highest PDCP count value in the at least one packet data convergence protocol layer protocol data unit.

* * * * *